US011237870B1

(12) United States Patent
Maclinovsky et al.

(10) Patent No.: US 11,237,870 B1
(45) Date of Patent: Feb. 1, 2022

(54) DYNAMICALLY MODIFYING PROGRAM EXECUTION CAPACITY

(71) Applicant: Amazon Technologies, Inc., Seattle, WA (US)

(72) Inventors: Alex Maclinovsky, Bellevue, WA (US); Blake Meike, Seattle, WA (US); Chiranjeeb Buragohain, Seattle, WA (US); Christopher Reddy Kommareddy, Lynnwood, WA (US); Geoffrey Scott Pare, Seattle, WA (US); John W. Heitmann, Seattle, WA (US); Sumit Lohia, Seattle, WA (US); Liang Chen, Mercer Island, WA (US); Zachary S. Musgrave, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 16/846,121

(22) Filed: Apr. 10, 2020

Related U.S. Application Data

(63) Continuation of application No. 14/664,592, filed on Mar. 20, 2015, now Pat. No. 10,642,653, which is a
(Continued)

(51) Int. Cl.
*G06F 9/50* (2006.01)
*G06Q 10/06* (2012.01)
(Continued)

(52) U.S. Cl.
CPC .......... *G06F 9/5011* (2013.01); *G06F 9/4881* (2013.01); *G06F 9/505* (2013.01);
(Continued)

(58) Field of Classification Search
CPC ..... H04L 67/10; H04L 67/12; H04L 41/0893; H04L 41/0896; H04L 41/14;
(Continued)

(56) References Cited

U.S. PATENT DOCUMENTS 5,408,587 A 4/1995 Maier et al.
5,911,149 A 6/1999 Luan et al.
(Continued)

FOREIGN PATENT DOCUMENTS

JP 2005-196601 A 7/2005
JP 2005-250818 A 9/2005
JP 2009-532771 A 9/2009

OTHER PUBLICATIONS

T. C. Chieu, A. Mohindra, A. A. Karve and A. Segal, "Dynamic Scaling of Web Applications in a Virtualized Cloud Computing Environment," 2009 IEEE International Conference on e-Business Engineering, 2009, pp. 281-286, doi: 10.1109/ICEBE.2009.45. (Year: 2009).*

(Continued)

*Primary Examiner* — David R Lazaro
(74) *Attorney, Agent, or Firm* — Nicholson De Vos Webster & Elliott, LLP

(57) ABSTRACT

Techniques are described for managing program execution capacity, such as for a group of computing nodes that are provided for executing one or more programs for a user. In some situations, dynamic program execution capacity modifications for a computing node group that is in use may be performed periodically or otherwise in a recurrent manner, such as to aggregate multiple modifications that are requested or otherwise determined to be made during a period of time, and with the aggregation of multiple determined modifications being able to be performed in various manners. Modifications may be requested or otherwise determined in various manners, including based on dynamic (Continued)

instructions specified by the user, and on satisfaction of triggers that are previously defined by the user. In some situations, the techniques are used in conjunction with a fee-based program execution service that executes multiple programs on behalf of multiple users of the service.

21 Claims, 9 Drawing Sheets

Related U.S. Application Data continuation of application No. 13/619,844, filed on Sep. 14, 2012, now Pat. No. 9,400,690, which is a continuation of application No. 12/569,723, filed on Sep. 29, 2009, now Pat. No. 8,352,609.

(51) Int. Cl.
  G06Q 30/04 (2012.01)
  G06F 9/48 (2006.01)
  H04L 29/08 (2006.01)

(52) U.S. Cl.
  CPC ............ *G06F 9/5061* (2013.01); *G06Q 10/06* (2013.01); *G06Q 30/04* (2013.01); *H04L 67/10* (2013.01); *H04L 67/34* (2013.01); *Y04S 10/50* (2013.01)

(58) Field of Classification Search
  CPC ............... H04L 41/142; H04L 41/5009; H04L 41/5019; H04L 41/5032; H04L 43/0811; H04L 43/0852; H04L 43/0864; H04L 43/0876; H04L 43/0882; G06F 11/3024; G06F 11/3452; G06F 9/46–5077
  See application file for complete search history.

(56) References Cited

U.S. PATENT DOCUMENTS

| | | | |
|---|---|---|---|
| 6,779,030 B1 | 8/2004 | Dugan et al. | |
| 7,209,964 B2 | 4/2007 | Dugan et al. | |
| 7,322,034 B2 | 1/2008 | Crawford et al. | |
| 7,590,746 B2 | 9/2009 | Slater et al. | |
| 7,734,676 B2* | 6/2010 | Dritschler | G06F 9/5061 709/200 |
| 7,757,214 B1* | 7/2010 | Palczak | G06F 9/5083 717/121 |
| 7,822,862 B2 | 10/2010 | Slater et al. | |
| 7,991,906 B2 | 8/2011 | Ng et al. | |
| 8,024,736 B1 | 9/2011 | Graupner et al. | |
| 8,261,266 B2* | 9/2012 | Pike | G06F 9/4856 718/1 |
| 8,321,558 B1 | 11/2012 | Sirota et al. | |
| 8,352,609 B2* | 1/2013 | Maclinovsky | G06F 9/5011 709/226 |
| 8,374,929 B1 | 2/2013 | Lappas et al. | |
| 8,560,671 B1 | 10/2013 | Yahalom et al. | |
| 9,329,909 B1* | 5/2016 | Khanna | G06F 9/5072 |
| 9,400,690 B2* | 7/2016 | Maclinovsky | G06F 9/5061 |
| 10,296,385 B2* | 5/2019 | Maclinovsky | G06F 9/5011 |
| 10,642,653 B2* | 5/2020 | Maclinovsky | G06F 9/5011 |
| 10,860,347 B1* | 12/2020 | Porter | G06F 11/3055 |
| 2003/0115244 A1 | 6/2003 | Molloy et al. | |
| 2003/0163734 A1* | 8/2003 | Yoshimura | H04L 63/145 726/22 |
| 2003/0212734 A1 | 11/2003 | Stewart | |
| 2004/0010544 A1 | 1/2004 | Slater et al. | |
| 2004/0244007 A1* | 12/2004 | Garza | G06F 9/546 718/105 |
| 2005/0132362 A1 | 6/2005 | Knauerhase et al. | |
| 2005/0144234 A1 | 6/2005 | Tanaka et al. | |
| 2006/0101464 A1* | 5/2006 | Dohrmann | G06F 9/5066 718/100 |
| 2006/0173856 A1 | 8/2006 | Jackson et al. | |
| 2006/0173857 A1 | 8/2006 | Jackson | |
| 2006/0179143 A1 | 8/2006 | Walker et al. | |
| 2007/0143220 A1 | 6/2007 | Yasuhiro | |
| 2007/0150571 A1 | 6/2007 | Haga et al. | |
| 2007/0240160 A1 | 10/2007 | Paterson-Jones et al. | |
| 2008/0059557 A1 | 3/2008 | Desantis et al. | |
| 2008/0080552 A1 | 4/2008 | Gates et al. | |
| 2008/0082490 A1 | 4/2008 | MacLaurin et al. | |
| 2008/0222642 A1 | 9/2008 | Kakarla et al. | |
| 2008/0244600 A1* | 10/2008 | Wong | G06F 9/50 718/104 |
| 2009/0016220 A1 | 1/2009 | Uysal et al. | |
| 2009/0144404 A1* | 6/2009 | Wolman | G06F 9/5033 709/223 |
| 2009/0157737 A1 | 6/2009 | Konik et al. | |
| 2009/0182605 A1* | 7/2009 | Lappas | G06Q 10/06 705/34 |
| 2009/0183168 A1 | 7/2009 | Uchida | |
| 2009/0276771 A1* | 11/2009 | Nickolov | H04L 67/1014 717/177 |
| 2010/0057831 A1 | 3/2010 | Williamson | |
| 2010/0107172 A1 | 4/2010 | Calinescu et al. | |
| 2010/0211519 A1 | 8/2010 | Giannetti | |
| 2010/0211958 A1 | 8/2010 | Madison et al. | |
| 2010/0223383 A1 | 9/2010 | Salevan et al. | |
| 2011/0078411 A1* | 3/2011 | Maclinovsky | G06F 9/5011 712/30 |
| 2011/0078705 A1* | 3/2011 | Maclinovsky | G06Q 20/085 719/318 |
| 2013/0073610 A1* | 3/2013 | Maclinovsky | G06Q 10/06 709/203 |
| 2015/0193276 A1* | 7/2015 | Maclinovsky | G06F 9/5061 718/104 |
| 2016/0335123 A1* | 11/2016 | Maclinovsky | G06F 9/5011 |

OTHER PUBLICATIONS

Victoria Ungureanu, Benjamin Melamed, Michael Katehakis,"Effective load balancing for cluster-based servers employing job preemption" Performance Evaluation, vol. 65, Issue 8, 2008, pp. 606-622 (Year: 2008).*

3tera, "Cloud Computing Without Compromise," retrieved Aug. 11, 2009, from http://www.3tera.com/Cloud-computing/faq.php, 2 pages.

3tera, "Cloudware Open Architecture for Cloud Computing," retrieved Aug. 11, 2009, from http://www.3tera.com/Cloud-computing/, 2 pages.

Amazon Web Services, "Amazon Elastic Compute Cloud (Amazon EC2)," retrieved on Aug. 11, 2009, from http://aws.amazon.com/ec2/, 7 pages.

Amazon Web Services, "Announcement Introducing Monitoring, Auto Scaling and Elastic Load Balancing for Amazon EC2," May 17, 2009, retrieved on Jul. 6, 2009, from http://developer.amazonwebservices.com/connect/ann.jspa?annID=446, 1 page.

Amazon Web Services, "Auto Scaling," retrieved on Aug. 11, 2009, from http://aws.amazon.com/autoscaling, 2 pages.

Metz, C. "Amazon Teaches Cloud Self-Growth Trick," May 18, 2009, retrieved on Aug. 11, 2009, from http://www.theregister.co.uk/2009/05/18/amazon_cloud_monitoring_and_fluffing_tools/print.html, 3 pages.

O'Reilly Conferences, "Pool Party: Autoscaling on EC2," May 30, 2008, retrieved on Aug. 11, 2009, from http://en.oreilly.com/rails2008/public/schedule/detail/4528, 4 pages.

Rackspace Cloud, "Cloud Sites—The Power of Cloud Computing & Cloud Hosting by Rackspace," retrieved on Aug. 11, 2009, from http://www.rackspacecloud.com/cloud_hosting_products/sites, 4 pages.

Rackspace Cloud, "Cloud Sites and Cloud Computing FAQ from Rackspace Cloud Hosting," retrieved on Aug. 11, 2009, from http://www.rackspacecloud.com/cloud_hosting_products/sites/faq, 9 pages.

Right Scale, "Scalable Website," retrieved on Aug. 11, 2009, from http://www.rightscale.com/products/cloud-computing-uses/scalable-website.php?clickTag=Scalab . . . , 6 pages.

(56) References Cited

OTHER PUBLICATIONS

WeoCEO, retrieved Aug. 11, 2009, from http://weoceo.weogeo.com/, 1 page.
Wikipedia, "Tivoli Software," retrieved Aug. 11, 2009, from http://en.wikipedia.org/wiki/Tivoli_Software, 2 pages.
Willis, John M., "Tools to Use in the Cloud (Revised)," Feb. 4, 2009, retrieved on Aug. 11, 2009, from http://www.johnmwillis.com/other/tools-to-use-in-the-cloud/, 8 pages.
Work, H., "Scalr: The Auto-Scaling Open-Source Amazon EC2 Effort," Apr. 3, 2008, retrieved on Aug. 11, 2009, from http://www.techcrunch.com/2008/04/03/scalr-the-auto-scaling-open-source-amazon-ec2-effort/, 7 page.

\* cited by examiner

Example Computing Node Group Changes Database

| Change ID | Group ID | Change Type | Change Result | Change Details | Start Time | End Time | Time Period | Change-Event Nexus ID |
|---|---|---|---|---|---|---|---|---|
| C01 | Group1 | computing node quantity | add nodes | +4 nodes | T01 | T02 | H1 | N1 |
| C02 | Group1 | computing node quantity | add nodes | +3 nodes | T01 | T03 | H1 | N1 |
| C10a | Group1 | computing node quantity | add node | -1 node | T01 | - | H1 | N1 |
| C10b | Group1 | computing node quantity | terminate uninitialized node | -1 node | T04 | T04 | H1 | N2 |
| C03 | Group1 | computing node quantity | add node | -1 node | T04 | T05 | H1 | N3 |
| C04 | Group1 | computing node quantity | terminate unavailable node | -1 node | T07 | T07 | H1 | N4 |
| C05 | Group1 | computing node quantity | add nodes | +5 nodes | T07 | T09 | H1 | N5 |
| C06 | Group1 | computing node quantity | terminate unavailable node | -1 node | T20 | T20 | H2 | N6 |
| C07 | Group1 | computing node quantity | terminate unavailable node | -1 node | T21 | T22 | H2 | N7 |
| C08 | Group1 | computing node quantity |  | -1 node | T28 | T28 | H3 | N8 |
| C09 | Group1 | computing node quantity | remove node | -1 node | T31 | T32 | H4 | N9 |

Fig. 2B

Example Computing Node Group Events Database

| Event ID | Group ID | Event Type | Event Source | Time | Time Period | Change-Event Nexus ID |
|---|---|---|---|---|---|---|
| E01 | Group1 | group initialization | user instruction | T01 | H1 | N1 |
| E02a | Group1 | failed node initialization detected | system initiated | T04 | H1 | N2 |
| E02b | Group1 | uninitialized node terminated | system initiated | T04 | H1 | N3 |
| E03a | Group1 | unavailable node detected | system initiated | T07 | H1 | N4 |
| E03b | Group1 | unavailable node terminated | system initiated | T07 | H1 | N5 |
| E05 | Group1 | increase desired quantity by 4 | trigger TR-1 | T16 | H2 | N7 |
| E06 | Group1 | increase desired quantity by 2 | trigger TR-N | T18 | H2 | N7 |
| E04 | Group1 | increase desired quantity by 3 | user instruction | T19 | H2 | N7 |
| E09a | Group1 | unavailable node detected | system initiated | T20 | H2 | N6 |
| E09b | Group1 | unavailable node detected | system initiated | T20 | H2 | N7 |
| E08 | Group1 | decrease desired quantity by 2 | trigger TR-3 | T27 | H3 | N9 |
| E10a | Group1 | unavailable node terminated | system initiated | T28 | H3 | N8 |
| E10b | Group1 | unavailable node detected | system initiated | T28 | H3 | N9 |

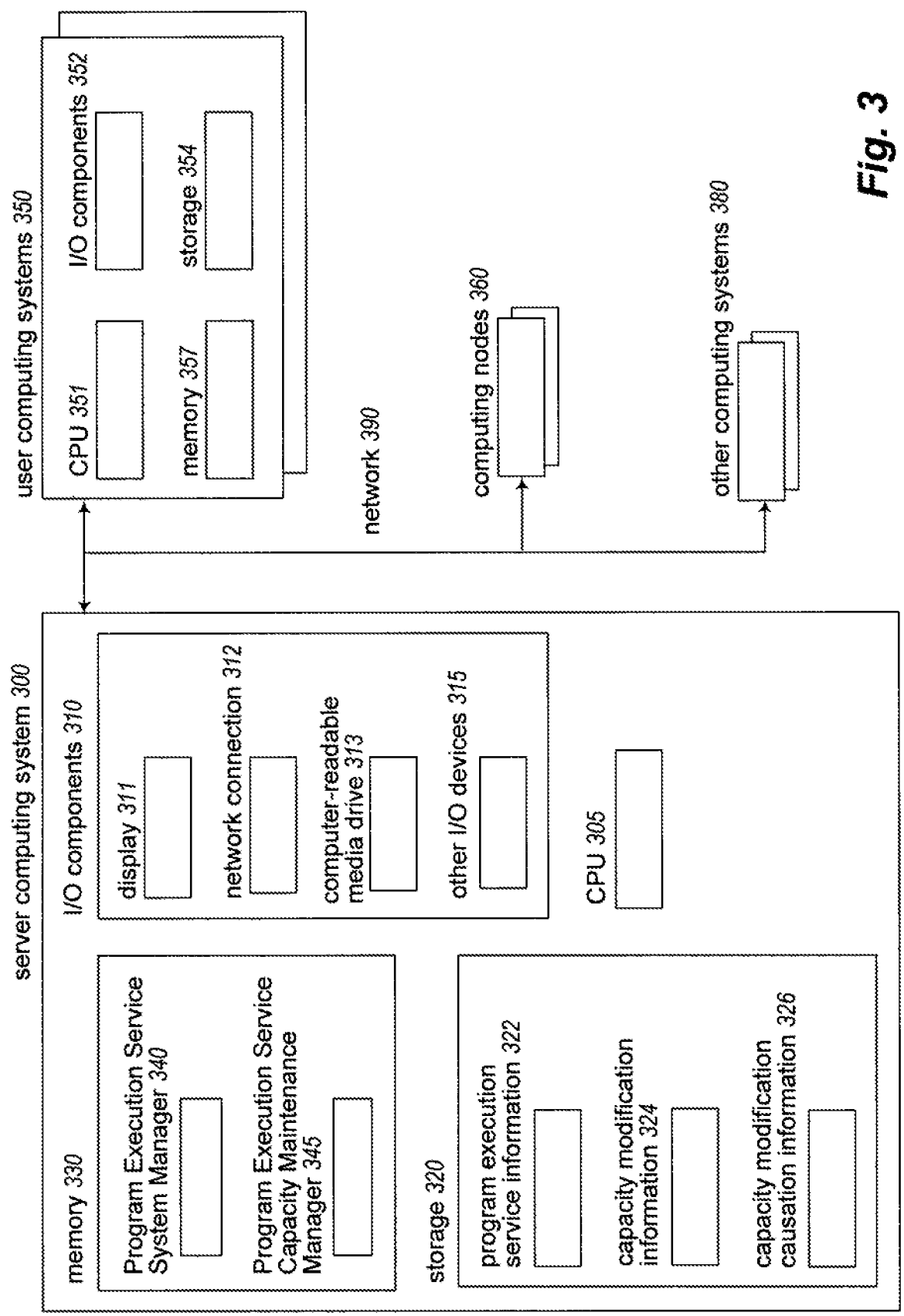

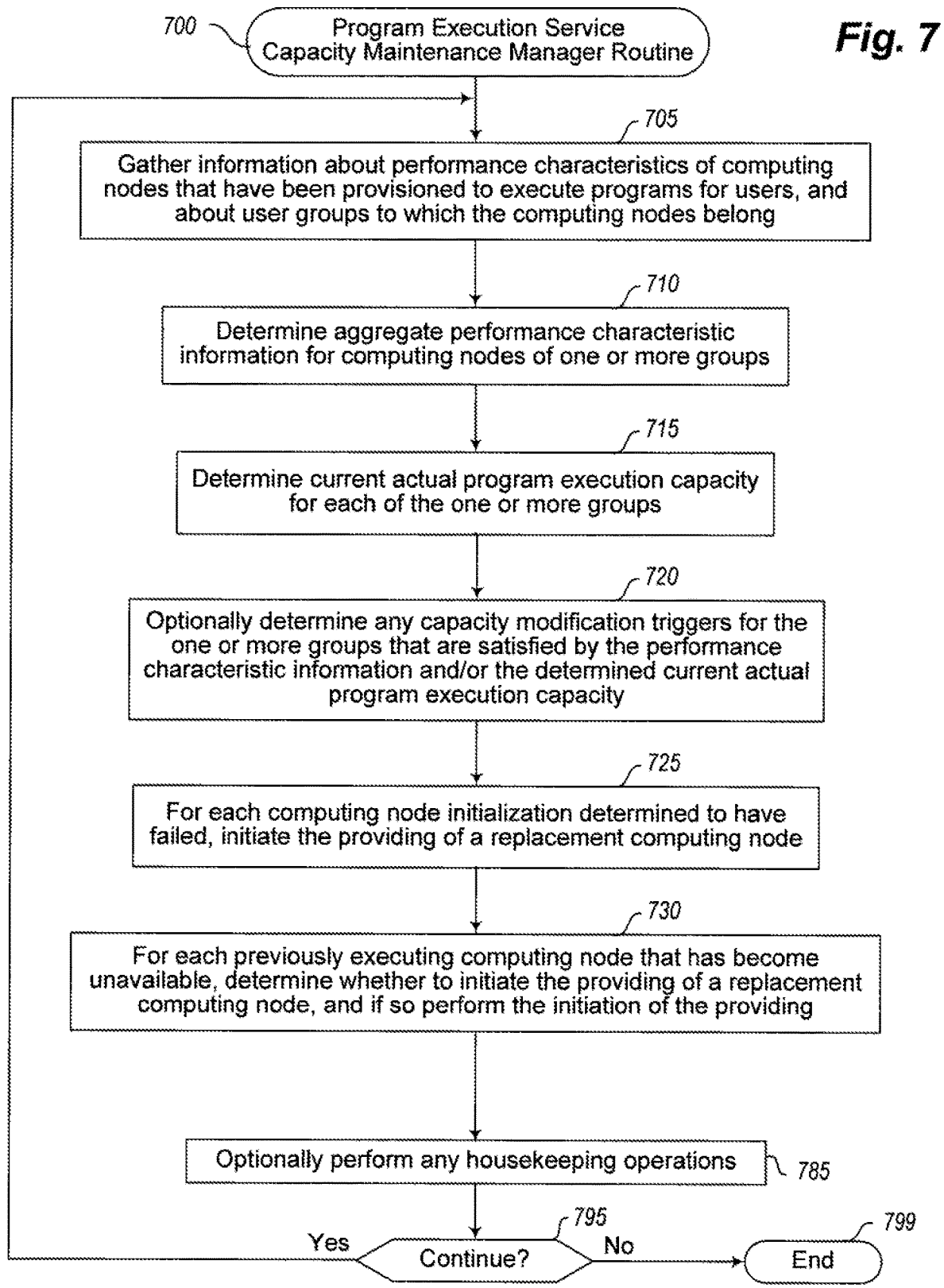

DYNAMICALLY MODIFYING PROGRAM EXECUTION CAPACITY

CROSS-REFERENCE TO RELATED APPLICATIONS

This application is a continuation of U.S. application Ser. No. 14/664,592, filed Mar. 20, 2015, which is a continuation of U.S. application Ser. No. 13/619,844, filed Sep. 14, 2012, now U.S. Pat. No. 9,400,690, which is a continuation of U.S. application Ser. No. 12/569,723, filed Sep. 29, 2009, now U.S. Pat. No. 8,352,609, which is hereby incorporated by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many users with diverse needs, allowing various computing resources to be efficiently and securely shared by multiple users. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 2A and 2B illustrate examples of managing program execution capacity of a group of multiple computing nodes for a user, such as to dynamically modify the available program execution capacity at various times and in various manners.

FIG. 3 is a block diagram illustrating an example embodiment of a computing system for managing program execution capacity provided to multiple users.

FIG. 7 illustrates a flow diagram of an example embodiment of a Program Execution Service Capacity Maintenance Manager routine.

DETAILED DESCRIPTION

Figure 1A:
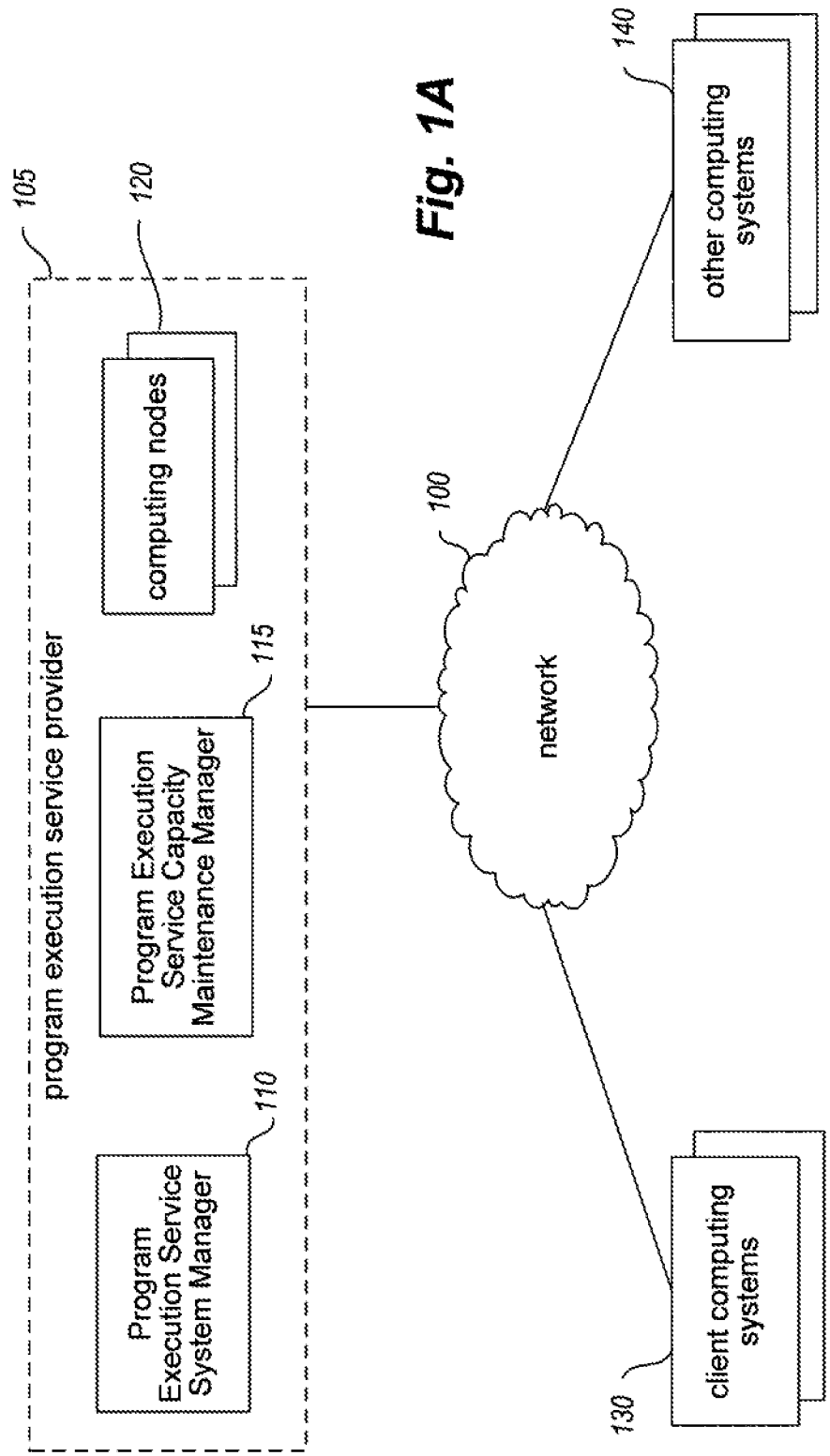
FIGS. 1A and 1B are network diagrams illustrating example embodiments of interactions to manage program execution capacity available to multiple users of a program execution service.

Techniques are described for managing program execution capacity used to execute programs for one or more users. In at least some embodiments, the program execution capacity being managed includes a group of one or more computing nodes that are provided for use by a user in executing one or more programs. In addition, the group of computing nodes associated with a user may be dynamically modified while in use in order to manage an amount of program execution capacity that is available to the user from the computing nodes of the group. The modifications to the group of computing nodes associated with a user may have various forms in various embodiments (e.g., to modify a quantity of computing nodes in the group, such as by dynamically adding and/or removing computing nodes), and may be initiated in various manners in various embodiments (e.g., based on dynamic instructions specified by the user, based on automated determinations of satisfaction of triggers that are previously defined by the user, based on automated operations of a service that is providing the computing nodes of the group, etc.). Additional details related to the dynamic modification of program execution capacity available from a group of computing nodes are included below. In addition, in at least some embodiments, the techniques may be used in conjunction with a program execution service ("PES") that executes multiple programs on behalf of multiple customers or other users of the service, such as a network-accessible program execution service that provides multiple computing nodes (e.g., multiple physical computing systems and/or virtual machines that are hosted on one or more physical computing systems) for executing programs of remote users. Some or all of the techniques may also be automatically performed by embodiments of a Program Execution Service System Manager module and/or a Program Execution Service Capacity Maintenance Manager module, as described in greater detail below.

As previously noted, the dynamic modifications that are performed to a group of computing nodes that is in use executing one or more programs for a user may have various forms and may be initiated in various manners in various embodiments. As one example, the program execution capacity of the group of computing nodes may be measured at least in part by the quantity of computing nodes that are part of the group, and may be modified by changing the computing node quantity of the group (e.g., to increase the program execution capacity by increasing the computing node quantity, and to decrease the program execution capacity by decreasing the computing node quantity). Such computing node quantity modifications may be used, for example, in situations in which some or all of the computing nodes in the group provide or have access to the same or similar amounts of computing resources (e.g., amounts of memory, hard drive space, CPU execution cycles, network bandwidth, etc.), such that a given percentage change in computing node quantity corresponds to the same or similar percentage change in total computing resources and program execution capacity of the group. In other embodiments, some or all of the computing nodes of the group may differ in one or more significant manners with respect to the amount of computing resources to which they have access (e.g., if two or more distinct types of computing node configurations are used, if each computing node is configured independently of the other computing nodes, etc.) or otherwise with respect to the types of program execution capacity that they provide (e.g., based on specialized hardware, types of software programs, etc.), but dynamic program execution capacity modifications for the group may nonetheless be based at least in part on modifying a quantity of the computing nodes of the group, or instead may be based in other manners (e.g., changing from one type of computing node configuration to another), as discussed in greater detail elsewhere.

Furthermore, in at least some embodiments and situations, the program execution capacity of a group of one or more computing nodes may be measured and modified in manners other than a quantity of the computing nodes, such as based on an aggregate amount of one or more types of computing resources provided by the group (e.g., amounts of memory, hard drive space, CPU execution cycles, network bandwidth, etc.). In addition, in at least some embodiments, additional factors may be considered in measuring and specifying program execution capacity for a group of computing nodes, such as a geographical location of some or all of the computing nodes, inter-relationships between some or all of the computing nodes (e.g., to be separated by at most a maximum geographical distance or at least a minimum geographical distance, to be separated by at most a maximum network latency or at least a minimum network latency, to be separated into two or more independent data centers or other computing node collections that are unlikely to fail simultaneously, etc.), availability of specialized hardware capabilities and/or software capabilities, etc. Additional details related to measuring and specifying program execution capacity are included below.

A PES or other system that is managing the computing nodes of a group that is in use executing one or more programs for a user may automatically determine how and when to make dynamic program execution capacity modifications for the computing node group in various manners. For example, in at least some embodiments and situations, the PES or other system may make some types of program execution capacity modifications in an immediate manner, while other types of program execution capacity modifications may be performed periodically or otherwise in a recurrent manner (e.g., so as to defer and aggregate multiple modifications that are requested or otherwise determined to be made during a period of time, such as since a prior performance of one or more aggregated modifications). If multiple program execution capacity modification determinations are aggregated over a period of time, information about the aggregated modification determinations may be used to enhance the performance of the program execution capacity modifications in various manners. For example, if two determined program execution capacity modifications correspond to opposite types of modifications (e.g., to increase and decrease computing node quantity, to increase and decrease available aggregate memory, etc.), the two modifications may be aggregated in various manners, such as by being selected to partially or completely offset each other, or instead by selecting a higher priority of the two modifications to be performed in lieu of the other modification. In addition, if two or more determined program execution capacity modifications correspond to similar or complementary types of modifications (e.g., to all increase computing node quantity by specified amounts, to all increase available aggregate memory by specified amounts, etc.), those determined modifications may similarly be aggregated in various manners (e.g., to select a single determined modification that satisfies some specified criteria, such as the largest, the smallest, the one with the highest priority, the one that was determined first, the one that was determined last, etc.; to accumulate the various determined modifications and use the accumulated modification amount; etc.). Additional details related to determining how and when to make various types of program execution capacity modifications are included below.

In addition, when a PES or other system dynamically performs program execution capacity modifications to a group of computing nodes that is executing one or more programs on behalf of a user, the PES or other system may further perform various operations to attribute causality information or other responsibility for particular program execution capacity modifications. The attribution of responsibility may include, for example, identifying particular events that have occurred during a relevant time period that each are capable of causing a dynamic program execution capacity modification, and attributing one or more of the events to some or all of the dynamic program execution capacity modifications that are performed during or subsequent to that time period. For example, some dynamic program execution capacity modifications may each be initiated by a single particular event in at least some embodiments and situations (e.g., if a computing node of the group fails or otherwise becomes unavailable, and the system automatically immediately initiates the providing of a replacement computing node for the group, with the computing node unavailability being a single event that directly causes the automated system actions to provide the replacement computing node). Other dynamic program execution capacity modifications may each be attributed to a combination of multiple events that each contributed or may have contributed to the capacity modification in at least some embodiments and situations (e.g., if multiple independent events each request or indicate an increase in computing node quantity for the group during a period of time, and are aggregated to perform a single computing node quantity increase at the end of the time period, with the various independent events being multiple events that together indirectly cause the later automated system actions to perform the computing node quantity increase).

The attribution of responsibility for particular dynamic program execution capacity modifications to a computing node group associated with a user may have particular benefits in situations such as, for example, when the user is charged for at least some of the program execution capacity modifications (e.g., if the PES or other system is a fee-based system that charges user customers for providing each computing node of the group, for each other measure of amount of program execution capacity, and/or on other bases). In such situations, the user may not only be able to receive and review information about charges that correspond to particular dynamic program execution capacity modifications, but also the associated responsibility attribution information to enable the user to affirm the cause of and appropriateness of those dynamic program execution capacity modifications. In at least some such embodiments, the responsibility attribution information may be generated in a human-readable format for display to the user, to enable the user to understand the explanation of why various automated actions were taken by the PES or other system that is included in the human-readable information. Such responsibility attribution information may also be used in various other manners in other embodiments, including by the PES or other system to automatically initiate other operations. In addition, in at least some embodiments, the responsibility attribution information may be generated and/or used in response to various types of queries received from users or other sources, such as a request to identify which event(s) are the cause of a particular indicated program execution capacity modification or other change in availability of one or more computing nodes of a group, and/or of which program execution capacity modification(s) or other computing node group availability change(s) are caused by one or more indicated events. Additional details related to determining and using responsibility attribution information for dynamic program execution capacity modifications are included below.

The described techniques for automatically managing dynamic program execution capacity modifications may provide various benefits in various situations. For example, by aggregating multiple requested or determined dynamic program execution capacity modifications for consideration together, the PES or other system may be able to optimize how the aggregated modifications are performed, as well as to minimize repeated changes to the computing nodes that may create periods of temporary unavailability of some or all of the computing nodes for additional changes. In addition, a user may predefine various types of triggers that are based on performance characteristics of a group of computing nodes, with the program execution capacity being automatically increased or decreased as appropriate as particular triggers are satisfied (e.g., to reactively increase the program execution capacity of a group of computing nodes to accommodate a temporary increase in the computing load for the computing node group; to proactively increase or decrease the program execution capacity of a group of computing nodes to accommodate an expected upcoming need for additional program execution capacity and/or an expected upcoming lack of need for existing program execution capacity, such as based on trends over time in particular performance characteristics and/or historical data indicating recurring patterns of program execution capacity use; etc.). Alternatively, a user may desire to maintain the program execution capacity for a group of computing nodes at or near a specified level (e.g., a specified desired constant quantity of computing nodes), and various modifications may be automatically made to the group of computing nodes to maintain the available program execution capacity at that specified level (e.g., to return an actual computing node quantity that has deviated from the specified desired quantity back to that specified desired quantity). Such techniques may be of use, for example, when each of the computing nodes of the group executes a distinct copy of the same program (e.g., to serve as alternatives for an aggregate computing load over the group), and the quantity of computing nodes are modified to manage the amount of work handled by each computing node, or otherwise in situations in which the various computing nodes of a group do not each execute a distinct copy of the same program (e.g., if distinct subsets of the group computing nodes each execute copies of different programs, such as to have some computing nodes execute an application server program and to have other computing nodes execute an associated database server program; if some or all of the computing nodes perform different parts of a single program, such as in a distributed manner; etc.). Furthermore, when adding additional computing nodes to a group, the PES or other system may further optionally take other actions in at least some situations, such as to provision the added computing node to be ready to execute one or more programs, or to further automatically initiate the execution of the one or more programs on the added computing node.

As previously noted, users may predefine various types of triggers related to dynamically modifying program execution capacity for groups of computing nodes, and those triggers may be later used to initiate corresponding automated dynamic program execution capacity modifications for computing node groups of the users. As one example, a trigger may be defined that specifies a particular desired quantity of computing nodes or desired aggregate amount of one or more computing resources, such as may be used to automatically maintain a corresponding computing node group at that desired computing node quantity or desired aggregate computing resource amount, or instead to change to a specified computing node quantity or aggregate computing resource amount if specified criteria are satisfied. In other situations, a trigger may be defined that specifies a particular absolute or relative change in computing node quantity or aggregate amount of one or more computing resources, such as may be triggered if one or more indicated performance characteristics of the computing node group reach a specified threshold or otherwise satisfy a specified criteria (e.g., remain within a specified range for a specified period of time; show a particular trend, such as a specified amount of change over a specified period of time, or such as a particular "acceleration" or rate of change; match or other correspond to one or more specified patterns, such as from historical data that indicates recurring patterns of program execution capacity use; satisfy a specified logical or other combination of values for multiple performance characteristics, such as may be combined using logical operators such as AND, NOT, OR, etc. and/or in other manners; etc.). In other embodiments and situations, a predefined trigger may be otherwise satisfied based on information that is not part of the performance characteristics of the computing node group (e.g., based on a current time matching one or more specified times that are part or all of the criteria for a particular trigger, based on status information for one or more programs being executed on the current computing node group that is measured in manners other than performance characteristics, such as a current computing load as indicated by, for example, an amount of work that is queued for or otherwise known or expected to be performed by the one or more programs; based on performance characteristics or other status information for one or more other executing programs that are not being executed by the current computing node group, such as if the current computing node group is interacting with or otherwise supporting the other executing programs so as to, for example, increase the program execution capacity of the current computing node group as the computing load on the other executing programs increases or decreases; etc.). Such performance characteristics may be based on any measurable attribute of or other metric corresponding to the operation of one or more of the computing nodes of the group, including the following non-exclusive list: an absolute or relative amount of use of one or more computing resources of a single computing node (e.g., a percentage amount of available memory being used or CPU cycle utilization, an absolute amount of network bandwidth being used, etc.); an absolute or relative amount of aggregate use of one or more computing resources of all of the group computing nodes; an absolute or relative amount of latency or other delay in responding to communications from external computing systems; an absolute or relative amount of failures of the computing nodes in performing one or more desired actions; etc. Furthermore, in at least some embodiments and situations, rather than having a trigger directly specify a particular program execution capacity modification that is to occur when it is satisfied, the satisfaction of the trigger may cause a designated system or module to be notified, and that system or module may request a particular program execution capacity modification (e.g., a predefined capacity modification that does not vary; a capacity modification that is dynamically determined at the time of the notification, such as based on then-current conditions; etc.). In addition, the PES or other system may in some embodiments perform various operations to monitor a group of computing nodes in order to determine some or all of the performance characteristics for the triggers associated with the group, or may otherwise obtain such monitored performance characteristics from another source (e.g., from third-party software that monitors the computing nodes, from software executing on a computing node to monitor that computing node and optionally report the monitored information, etc.). Furthermore, in some embodiments, the PES or other system may have system-defined triggers that initiate dynamic program execution capacity modifications when indicated trigger criteria are satisfied, or may otherwise automatically determine to make some types of changes to computing node groups in specified circumstances.

When a defined trigger specifies a particular absolute or relative change in computing node quantity or aggregate amount of one or more computing resources, and the one or more specified criteria for the defined trigger are automatically determined to be satisfied based on current conditions for a corresponding group of computing nodes, the PES or other system may automatically determine whether and how to perform the specified program execution capacity modification for the trigger. For example, some types of specified program execution capacity modifications may be performed immediately (e.g., a request to terminate use of one or more computing nodes, a request based on a trigger that the user has designated for immediate performance, etc.), while other types of specified program execution capacity modifications may be deferred until the end of an aggregation period of time for consideration as part of an aggregation of multiple program execution capacity modifications that are requested or otherwise determined during that period of time. Similarly, program execution capacity modifications that are dynamically requested by a user (e.g., via a GUI, or graphical user interface of the PES or other system; by a program of the user via a defined API, or application programming interface, of the PES or other system; etc.) may be determined to be performed immediately and/or temporarily deferred and aggregated in a similar manner, such as based on the type of dynamic program execution capacity modification, based on an explicit request from the user for immediate or deferred performance, etc. Moreover, when determining how to manage a combination of multiple determined program execution capacity modifications, in some situations different priorities may be associated with different determined modifications. If so, such priorities may be assessed in various manners, such as for dynamically specified user requests or other user instructions to be given a different priority from satisfied triggers (e.g., a higher or lower priority), for different types of determined modifications to be given different priorities (e.g., for requests to decrease program execution capacity being given higher priority than requests to increase program execution capacity), etc. Additional details related to using user-defined triggers and determining performance characteristics are included below.

Furthermore, in at least some embodiments, the PES or other system may manage periodic or otherwise recurrent aggregations of multiple determined program execution capacity modifications based on tracking and using multiple attributes for a corresponding group of computing nodes, or otherwise with respect to controllable parameters that are each related to one or more computing nodes of the group. As one example, using computing node quantity for a computing node group as a metric corresponding to program execution capacity for the computing node group, the PES or other system may maintain and use at least three inter-related measures for the computing node group, as follows: a desired computing node quantity for the computing node group, such as may be initially set by an associated user when the computing node group is initiated, and may be modified by satisfaction of triggers and/or dynamically specified user requests; an actual computing node quantity of the currently available computing nodes of the group (e.g., as determined by continuous or repeated monitoring of the computing nodes of the group); and an official recorded computing node quantity of the currently available computing nodes of the group (e.g., as determined at the last time that one or more dynamic program execution capacity modifications are initiated, and optionally as updated occasionally by the continuous or repeated monitoring). Such multiple attributes for the computing node group may be used in various manners, such as to continuously or repeatedly measure the actual quantity and update the official recorded quantity accordingly (e.g., based on performing monitoring of the computing nodes of the group), and to periodically attempt to update the most recent official recorded quantity to match the current desired quantity (e.g., when considering how and whether to perform a combination of multiple aggregated determined modifications).

As previously noted, the PES or other system may further perform various operations to attribute causality information or other responsibility for particular dynamic program execution capacity modifications that are made. For example, as previously noted, events corresponding to requests for dynamic program execution capacity modifications for a computing node group may be tracked, including dynamic user-specified instructions that are received and predefined triggers that are automatically determined to be satisfied, as well as actions that are automatically taken by the PES or other system in some embodiments (e.g., based on monitoring that is performed, such as if a computing node is determined to have become frozen or otherwise unavailable to perform desired activities, to automatically shutdown or otherwise terminate the use of the computing node as part of its current computing node group). Similarly, actual changes in program execution capacity for the computing node group may similarly be tracked, such as changes corresponding to events and/or to other capacity changes that occur (e.g., instances of computing nodes failing or otherwise becoming unavailable). As one example, various event-related information may be stored in a first database table, and various information related to capacity change or other availability change may be stored in a second database table. If a relationship between a particular event and a particular availability change is identified (e.g., a particular event causes a particular availability change to be immediately performed), a corresponding nexus between that event and availability change may be tracked by storing the same nexus-related identifier along with the other information for that event and that availability change. In other situations in which multiple events may individually or in combination cause a particular availability change but in which causality is not attributed to a single event, a single nexus-related identifier may be stored along with the other information for that availability change and each of those events, and further for one or more other availability changes if they similarly may be attributed to those same multiple events individually or in combination. Thus, for example, if multiple events for a given computing node group occur during a single aggregation time period and one or more program execution capacity changes occur during that same aggregation time period or immediately after (e.g., as part of harmonization activities that are performed at the end of the aggregation time period), and if none of those events are directly attributable to any of the one or more capacity changes, the combination of all of the multiple events may be attributed to each of the one or more capacity changes. Further details related to such causality attribution are included below, including with respect to FIG. 2B.

In addition, in a similar manner, multiple such desired, actual and official attributes may be tracked and used for one or more other controllable parameters corresponding to program execution capacity for a computing node group, such as a first set of desired, actual and official amounts of aggregate average CPU cycle utilization, a second set of desired, actual and official amounts of aggregate average network bandwidth utilization, etc. Furthermore, when multiple parameters corresponding to program execution capacity for a computing node group are simultaneously tracked and used, the PES or other system may attempt to manage all of the parameters, such as to modify a computing node group in order to simultaneously achieve desired aggregate average CPU cycle utilization and desired aggregate average network bandwidth utilization. As another example, multiple parameters for a computing node group may include both a quantity of computing nodes and specified geographical locations of various computing nodes of the group (e.g., between fifteen and twenty percent of the group computing nodes at a first data center, and the remaining group computing nodes at one or more other data centers), with the PES or other system attempting to manage both computing node quantity and computing node geographical location for the group simultaneously. Additional details are included below related to using multiple attributes to track and manage one or more program execution capacity parameters.

In addition, a PES or other system may provide users with access to computing nodes in various manners in various embodiments. For example, in some embodiments, at least some of the computing nodes available from a PES for executing programs may be allocated to one or more users for preferential use by those users, such that each of those users has priority access relative to other users to use those computing nodes. In one such embodiment, the priority access of the users may be based on each of the users having dedicated or exclusive access to use those computing nodes for a specified period of time, such as in a manner analogous to a lease. In addition, in some embodiments, at least some of the computing nodes that are allocated to one or more users for dedicated or other preferential use may be used as excess program execution capacity for other users at times, such as when the computing nodes are not in use by the users to whom the computing nodes are allocated and/or when a user to whom a computing node is allocated explicitly makes the allocated computing node available for use by other users. In this manner, at least some program execution capacity that is allocated to a first group of users may become available from time to time to temporarily execute programs on behalf of other users, such as on a non-guaranteed basis (e.g., such that access to the excess program execution capacity may be rescinded if that program execution capacity is desired for other purposes, such as preferential or reserved use by one or more other users). Furthermore, in some embodiments, a PES may include on-demand computing nodes that are available to satisfy dynamically received requests of users to execute programs (e.g., immediately upon request of those users, at an indicated future time, at some time during an indicated future time period, etc.), such that the one or more programs indicated by such a request may be executed if computing nodes sufficient to satisfy the requested execution are available at (or near) the requested time, but without such a request being guaranteed to be satisfied. In addition, in some embodiments, after such an on-demand request for immediate (or scheduled) execution is satisfied and successfully initiates execution of one or more programs on behalf of a respective user, the ongoing use of the on-demand computing nodes may be guaranteed to continue until some future time, such as a time of the respective user's choosing, optionally subject to certain limitations (e.g., such as to be guaranteed that the PES will not preempt the use for other purposes, but not to be guaranteed against failure of the computing nodes executing the programs). In some embodiments, the computing nodes used to provide the on-demand variable program execution capacity may be distinct from the computing nodes used to provide dedicated program execution capacity and/or from the computing nodes used to provide excess program execution capacity—thus, if some of the computing nodes used to provide the on-demand variable program execution capacity are not in use, in some embodiments they may be used to provide excess program execution capacity until on-demand variable program execution capacity requests are received, while in other embodiments they may not be used to provide excess program execution capacity. In other embodiments, only a single type of program execution capacity may be provided, and/or other types of program execution capacity may be provided.

FIG. 1A is a network diagram that illustrates an example of a program execution service that manages computing nodes that are available for use in providing program execution capacity to execute programs for multiple users. For illustrative purposes, some examples and embodiments are described below in which specific types of program execution capability are provided and managed in specific manners. In addition, in some of the examples and embodiments described below, the program execution capacity that is provided by a group of computing nodes may be measured in particular manners (e.g., based on a quantity of the computing nodes), may be managed in particular manners (e.g., by tracking use of desired, actual and official attributes with respect to one or more program execution capacity metrics), may be controlled by associated users in various manners (e.g., based on the use of predefined triggers and/or dynamically specified instructions), may be modified in particular manners (e.g., by aggregating at least some program execution capacity modifications that are determined and deferred during a period of time and then performing one or more corresponding aggregated modifications at the end of the time period, such as to modify the quantity of computing nodes in a group), etc. These examples are provided for illustrative purposes and are simplified for the sake of brevity, and it will be appreciated that the inventive techniques may be used in a wide variety of other situations, only some of which are described below.

In the example of FIG. 1A, various users (not shown) are using various client computing systems 130 to interact over a network 100 with a PES provided by a program execution service provider entity 105, with some of the functionality of the PES being provided in this example by an illustrated embodiment of a Program Execution Service System Manager ("PESSM") module 110, and other functionality being provided in this example by an illustrated embodiment of a Program Execution Service Capacity Maintenance Manager ("PESCMM") module 115. The PESSM module 110 may, for example, assist particular users in configuring groups of computing nodes to be used to execute programs for the users, including specifying initial desired computing node quantities for the groups and specifying triggers for use in later automatically making dynamic modifications to the computing node quantities. In this example, the PES makes various computing nodes 120 available for executing programs of the users, although in other embodiments at least some of the computing nodes used for at least some of the groups may be provided in other manners (e.g., made available by the users and/or by third-parties, such as external computing systems 140, but managed by the PES). In addition, the PESCMM module 115 may assist in continuously or repeatedly monitoring computing node groups that are in use, and optionally attempting to replace any computing nodes that fail or otherwise become unavailable, so as to maintain program execution capacity at previously determined levels.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the PESSM module 110 and PESCMM module 115 may each include software instructions that execute on one or more computing systems (not shown). In addition, the modules 110 and 115 and various computing nodes 120 may be provided in various manners, such as at a single data center or otherwise to use a group of co-located computing systems, or instead in a distributed manner using various computing systems in various distinct geographical locations.

Figure 1B:
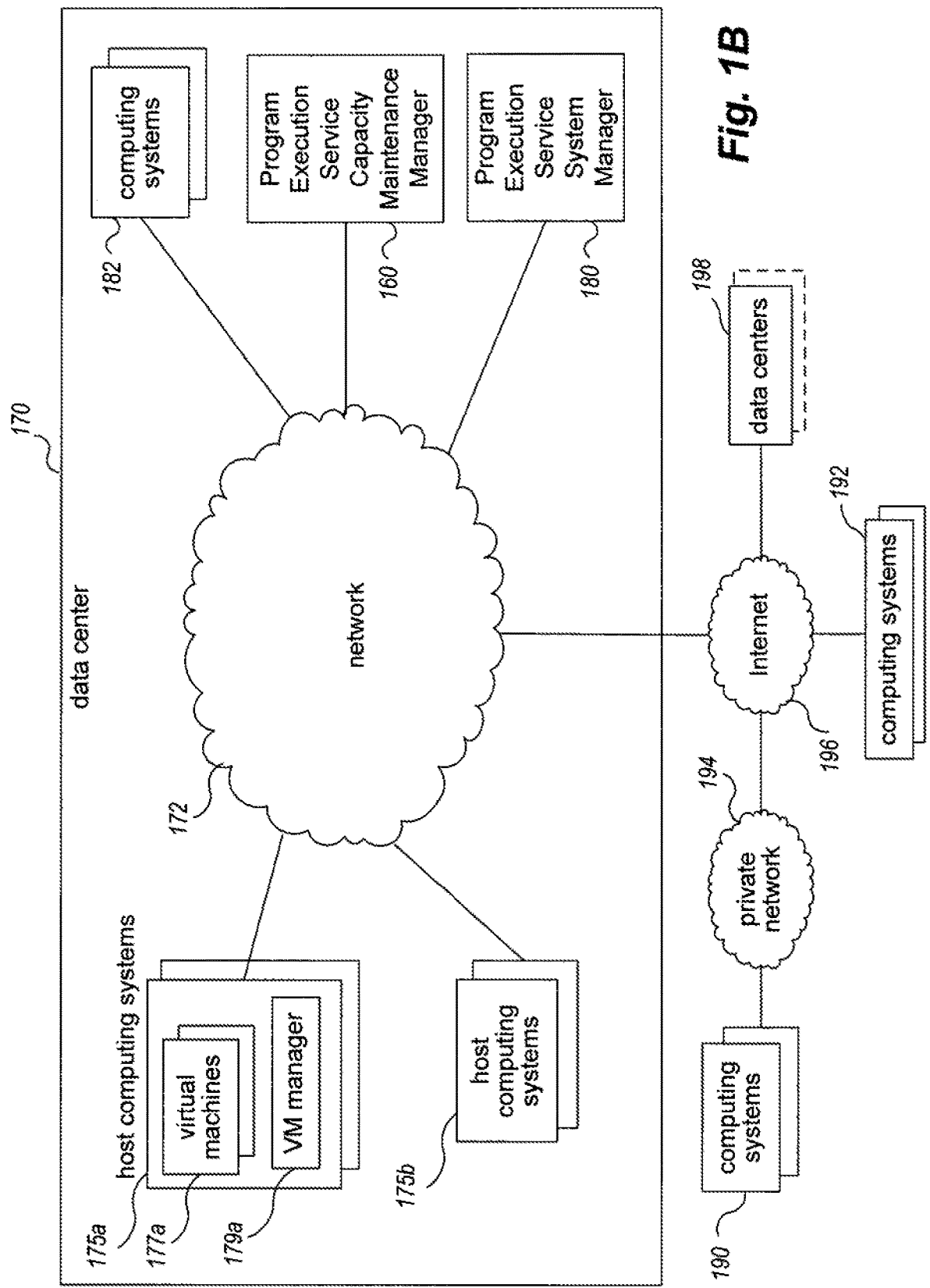

In some embodiments, the illustrated computing nodes 120 may include multiple physical computing systems and/or multiple virtual machines that are hosted on one or more physical computing systems (as is described in more detail with respect to FIG. 1B). Each of the computing nodes 120 has some amount of computing resources available for executing one or more programs, such as to provide a specific amount of program execution capacity, such as may be measured, for example, by a combination of one or more of processing capacity (e.g., number and/or size of processing units), memory capacity, storage capacity, network bandwidth capacity, etc. In some embodiments, the PES provider 105 may provide preconfigured computing nodes, with each preconfigured computing node having equivalent or otherwise similar amounts of resources available for executing programs on behalf of users, while in other embodiments, the PES provider 105 may provide a selection of various different computing nodes from which a user may choose for executing programs on behalf of the user, such as with each selection having varying amounts and/or types of computing resources (e.g., size, speed and/or type of processing units; number of processing units; amount of memory and/or storage; platform configuration, such as 32-bit or 64-bit; etc.).

In this illustrated embodiment, the program execution service provides functionality for managing groups of one or more computing nodes 120 for each of multiple users. As discussed in greater detail elsewhere, the various users may interact with the PESSM module 110 to specify requests to initiate use of groups of computing nodes for execution of programs on behalf of the users. In various embodiments, such resources may be specified at the time of a request for execution of one or more programs on a group of computing nodes on behalf of a user and/or at one or more other times, such as when a user initially registers and/or subscribes to use services of the PES. In some embodiments, the PESSM module 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the PESSM module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the PESSM module 110, not shown, may be provided to perform various operations related to subscription and/or registration services of a PES.

After a request is received from a user for use of one or more computing nodes, the PESSM 1 module 10 may determine whether there are a sufficient number of computing nodes 120 with available resources for satisfying the request, and if so, the PESSM 1 module 10 may initiate execution of one or more programs for the request on an appropriate amount of the computing nodes on behalf of the user. In cases where a user schedules a request for future execution of one or more programs on a group of one or more computing nodes, the PESSM module 110 may attempt to immediately reserve an appropriate amount of computing nodes for executing the one or more programs at the one or more future times, and/or may delay the determination of which computing nodes to use for execution until a later time (e.g., such as when the one or more future times occur). In the illustrated embodiment, if the PESSM module 110 is unable to allocate computing nodes for a user request, the request may fail, such that the programs are not executed. In such cases, the user may resubmit a failed request for later execution. As previously noted, in some embodiments, a user may be charged various fees in association with use of the PES, such as based on a number of computing nodes used, a type of computing nodes used, a duration of time the computing nodes are used, particular operations that the computing nodes perform (e.g., data transfer and/or storage), etc.

After a group of one or more computing nodes is provided for use in executing one or more programs on behalf of a user, the computing node group may be managed in various manners. For example, as previously noted, the PESCMM module 115 may monitor the computing nodes of the group, such as to determine performance characteristics of some or all of the computing nodes, including an actual computing node quantity or other measure of actual program execution capacity being provided by the computing nodes of the group. The actual program execution capacity of the group may change if, for example, one or more of the computing nodes fail or otherwise become unavailable, and in at least some embodiments, the module 115 may perform various operations to maintain the program execution capacity of the computing node group in such situations (e.g., by initiating the addition of replacement computing nodes to the group in place of the unavailable computing nodes). In addition, the module 115 may use information about a determined actual computing node quantity of the computing node group to update an official recorded computing node quantity of the computing node group, such as upon detecting a change in the actual computing node quantity, periodically, etc.

In addition, the PESSM module 110 may also assist in managing the computing node group in various manners. For example, as previously noted, the user associated with the group may have previously specified one or more quantity modification triggers that specify types of computing node quantity changes to be made to the group if various specified criteria are satisfied. Furthermore, in at least some embodiments, the user associated with the group may dynamically specify changes to the operation of their associated computing node group at various times, including to change the quantity of the computing nodes of the group. As part of managing the computing node group, the module 110 may track the desired computing node quantity for the computing node group, and periodically harmonize the official recorded computing node quantity for the computing node group with the desired computing node quantity for the computing node group. Such periodic harmonization may include tracking and aggregating requested modifications to the computing node quantity that occur during an aggregation period of time, such as from satisfaction of one or more of the predefined user-specified triggers and/or from one or more dynamically specified user instructions. At the end of the time period, the module 110 may then determine whether and how to perform the aggregated computing node quantity modifications, and may update the desired computing node quantity based on the aggregation of the computing node quantity modifications. The module 110 may then complete the harmonization of the desired and official recorded computing node quantities by initiating the aggregated computing node quantity modifications, and updating the official recorded computing node quantity to match the new desired computing node quantity that will result from the aggregated computing node quantity modifications. Furthermore, in cases in which the current actual computing node quantity differs from the official recorded computing node quantity at the end of the time period, the harmonization of the desired and official recorded computing node quantities may further be performed in light of the actual computing node quantity, such that the initiation of the aggregated computing node quantity modifications is performed to update the current actual computing node quantity to the current desired computing node quantity. The module 110 may further perform such periodic harmonization activities repeatedly, such as each time a specified period of time has elapsed, each time a minimum amount of computing node quantity changes have been requested, etc.

Furthermore, the PESSM module 110 may perform other activities to track events and particular program execution capacity changes that occur with respect to particular computing node groups. At least some of the program execution capacity change information may correspond to dynamic program execution capacity modifications that are initiated by the module 110 as part of periodic or recurrent harmonization activities, and optionally in some situations may further include program execution capacity change information from the monitoring performed by the PESCMM module 115 (e.g., to correspond to computing nodes that fail or otherwise become unavailable, or other types of detected changes in program execution capacity for computing node groups). The module 110 may further make automated determinations at various times to attribute causality or other responsibility for particular capacity changes to particular events, such as in accordance with periodic or other recurrent harmonization activities that are performed, or instead at other times.

Although the foregoing example embodiment of FIG. 1A is described with respect to a PES that provides various types of functionality for various users, it will be appreciated that various other embodiments may exist. For example, in at least some embodiments, unused portions of a single one of the computing nodes 120 (e.g., unused processing unit clock cycles, unused portions of memory, etc.) may be made available for use by one or more users, such that one or more programs of a first user may be sharing resources of a single computing node with those of one or more other users. In addition, although some embodiments are described with respect to a program execution service and program execution capacity, it will be appreciated that the described techniques may be used to manage access to various other groups of computing nodes or other types of computing-related resources. A non-exclusive list of examples of other types of computing-related resources that may be managed for use by multiple users may include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; etc.

FIG. 1B illustrates an embodiment in which a program execution service may be provided using one or more data centers that include multiple physical computing systems. In particular, FIG. 1B is a network diagram illustrating an example embodiment in which a PESSM module 180 and PESCMM module 160 of a program execution service manage execution of one or more programs on behalf of users using various computing systems at the one or more data centers. The illustrated example includes a data center 170 used by the PES, which is connected to the Internet 196 external to the data center 170. In this example, the Internet 196 provides access to various external computing systems, such as computing systems 190 via private network 194 and directly accessible computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the PES in at least some embodiments.

The example data center 170 includes a number of physical host computing systems 175, physical computing systems 182, a PESSM module 180 of the PES, and a PESCMM module 160 of the PES. In this example, host computing systems 175 each provide multiple virtual machines and have a virtual machine ("VM") manager component to manage those virtual machines (e.g., a hypervisor or other virtual machine monitor), such as is illustrated with respect to host computing system 175a with multiple virtual machines 177a and a VM manager component 179a. The other host computing systems 175b may similarly include such components, but those other components are not illustrated here for the sake of brevity, and some or all of the computing systems 182 may optionally similarly have one or more such virtual machines and/or VM manager components (not shown). Each of the virtual machines provided by a host computing system may be used as a distinct computing node for the PES, such as to have a first virtual machine computing node on a host computing system be part of a first computing node group for a first user, and to have a second virtual machine computing node on that same host computing system be part of a second computing node group for a second user. Alternatively, in other embodiments, some or all of the physical host computing systems at the data center may not provide any virtual machines, such as to instead directly act as a computing node that executes one or more programs on behalf of an end user customer of the PES. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their programs may be grouped (e.g., automatically) according to one or more such factors, which may further be used as constraints and/or preferences regarding which computing systems to select for executing particular programs. The example data center 170 further includes an internal network 172 that may include multiple networking devices (not shown), such as switches, edge routers, and core routers, with computing systems 175 and 182, the PESCMM module 160, and the PESSM module 180 connected to the internal network 172. The various host computing systems 175 and other computing systems 182 may be arranged in various manners, including by being grouped in racks that share common backplanes or other interconnection mediums. Furthermore, each of the modules 160 and 180 may be executed using one or more computing systems (not shown).

The illustrated PESSM module 180 and PESCMM module 160 perform at least some of the described techniques in order to manage execution of programs on groups of computing nodes that are provided using the computing systems 175 and 182, as described in greater detail elsewhere. When a particular computing node is selected to execute one or more programs of a user, the PESSM module may in some embodiments initiate execution of those programs by interacting with a VM manager component or other manager component that controls execution of programs for that selected computing node, or may alternatively directly execute the programs on the selected computing node. Users of the PES may use various computing systems to interact with the PESSM module 180, such as computing systems 190 or 192, or computing systems at one of the other data centers 198.

It will be appreciated that the data center of FIG. 1B is provided for illustrative purposes only, and that program execution services and other software execution services may be provided in other manners in other embodiments. For example, PESSM module 180 and/or PESCMM module 160 may instead be provided using one or more other computing systems external to the data center 170, such as computing systems 190, 192 or at a data center 198.

Figure 2A:
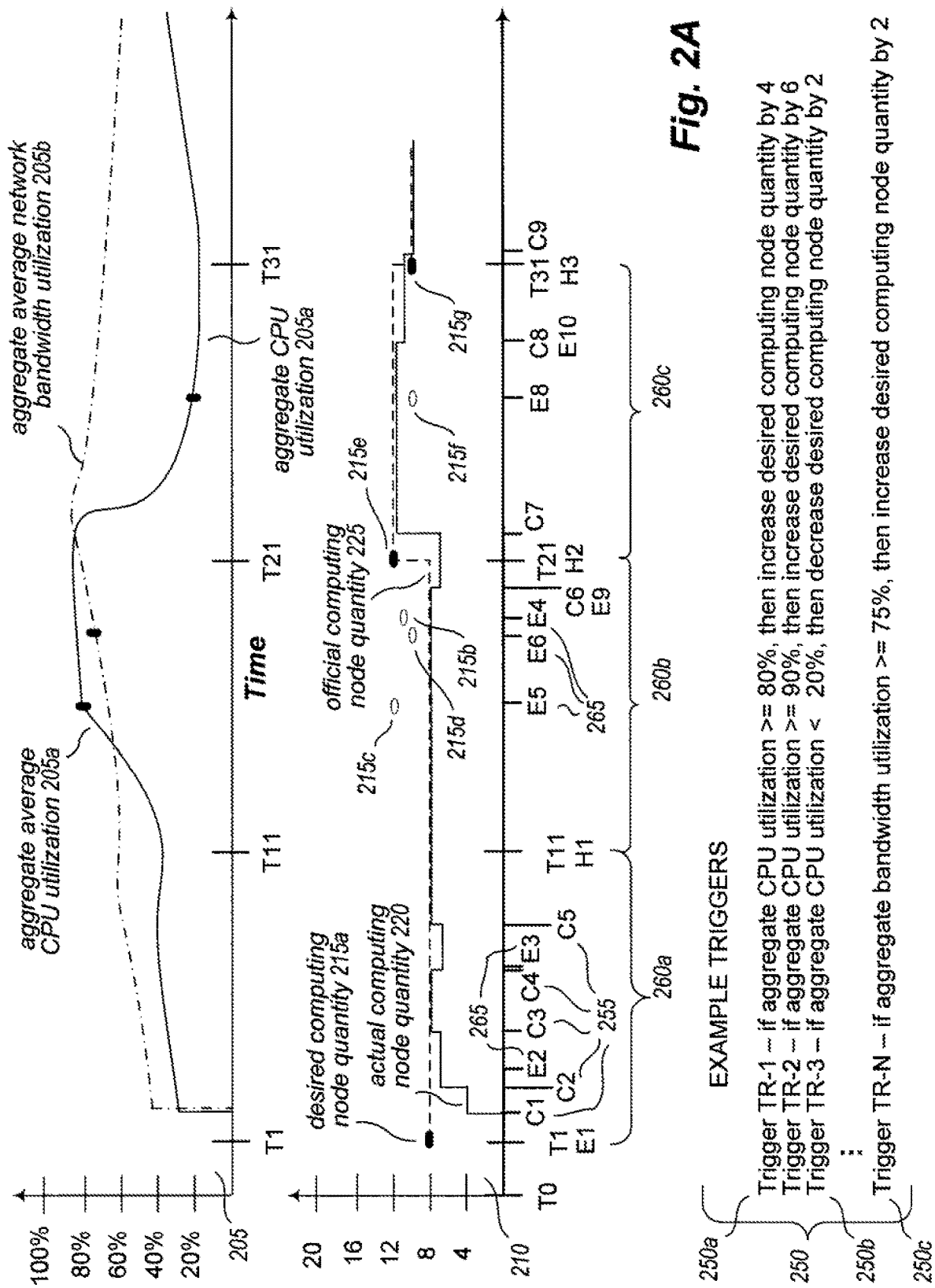

FIG. 2A illustrates an example of techniques for managing an example group of computing nodes that are provided to execute one or more programs of an example user, such as techniques that may be automatically performed by embodiments of a PESSM module and/or a PESCMM module. In particular, in this example, a particular user (referred to as User UUU below, and not shown in FIG. 2A) has initiated the use of a group of multiple computing nodes to each execute a copy of an indicated program on behalf of the user, such as to serve as alternative computing nodes to handle requests received by a service that is provided by the executing program (e.g., in order to balance the computing load for the service across the multiple computing nodes of the group). As is illustrated in the timeline graph 210, the user has requested at time T1 that the computing node group be provided, and has specified an initial desired computing node quantity 215a of 8 computing nodes for the group. Information 250 indicates various user-defined triggers that the user has specified for the computing node group, such as at the time of the initial request. In addition, timeline graph 205 illustrates information about two example types of performance characteristics that will be tracked for the computing node group and that will be used to determine whether the triggers 250 are satisfied, which in this example includes aggregate average CPU utilization 205a for the computing node group and aggregate average network bandwidth utilization 205b for the computing node group.

In response to the event E1 at time T1 corresponding to the received user request to initiate the providing of the computing node group, an example PES (not shown) initiates a computing node group for the user that initially includes eight computing nodes, in accordance with the initial desired computing node quantity. In addition, an official recorded computing node quantity 225 for the computing node group is similarly set to eight computing nodes. As is shown in the timeline graph 210, however, the eight computing nodes are not actually immediately available, as it takes some time to provision and make available the computing nodes for use as part of the computing node group, including having the program copy be executed on each of the computing nodes by the PES or the user. In particular, after an initial time has passed after time T1, a change C1 255 occurs in the program execution capacity for the computing node group, which is completed at approximately time T2 after having been begun at time T1, and which corresponds to a first four of the eight computing nodes being available. Accordingly, the actual computing node quantity 220 that is tracked for the computing node group increases from 0 to 4 at that time. In addition, at the same time or shortly thereafter, the timeline graph 205 indicates that the aggregate average CPU utilization 205a and aggregate average network bandwidth utilization 205b performance characteristics begin to be tracked based on operation of the available computing nodes of the group.

In this example, the PES (or other third-party system) performs monitoring of the computing nodes of the group in a substantially continuous manner, such that the performance characteristics 205a and 205b and the actual computing node quantity 220 information is maintained in an up-to-date manner. However, in this example, at least some types of dynamic modifications to the computing node quantity for the computing node group are performed only periodically, such as to aggregate at least some types of requested modifications during aggregation periods of time 260, and to perform harmonization activities at the end of the aggregation time periods between the desired, actual, and official recorded computing node quantities 215, 220 and 225, respectively. Accordingly, during a first aggregation time period 260a, additional changes 255 in the computing node quantity of the computing node group occur. For example, after the change C1 that makes the first four computing nodes available, a subsequent change C2 that is completed at approximately time T3 corresponds to three additional computing nodes becoming available for use as part of the computing node group.

However, in this example, the eighth computing node that was initially requested does not become available in a timely manner, such as due to a hardware problem with the computing node that is initially selected (or instead in other situations due to only 7 computing nodes being available at time T1 for use in the computing node group, with the eighth computing node to be dynamically added as soon as it later becomes available). Accordingly, an event E2 265 is shown occurring shortly after the change C2, at approximately time T4, in which the PES terminates the original eighth computing node if needed (e.g., if it is frozen in an intermediate state), and initiates the providing of a replacement eighth computing node. As discussed in greater detail with respect to FIG. 26, in this example, the PES had initiated a change C10a at time T1 that corresponds to adding the initial eighth computing node, but that change C10a fails to be completed with an actual eighth computing node that is added and becomes available, and thus the change C10a is not reflected in the actual computing node quantity 220 of timeline graph 210, nor otherwise shown in FIG. 2A. Instead, in this example, the event E2 is separated into two distinct events E2a and E2b (not shown separately) that occur at or near the same time. In particular, the PES records an event E2a at time T4 in this example that corresponds to the eighth computing node failing to initialize correctly (e.g., within a specified deadline), and the PES automatically initiates a change C10b (not shown) at time T4 to terminate the initial eighth computing node that failed to initialize correctly. Furthermore, in this example, the actual termination of the initial eighth computing node that occurs as the result of event E2a is itself treated as a separate event E2b at time T4 that automatically initiates the immediate providing of the replacement eighth computing node. Such chaining of events and results of corresponding changes, such that the result from the change for a first event may itself be treated as a second event that causes another change, may provide various benefits in tracking inter-relationships between events and corresponding change results, as discussed in greater detail elsewhere. Subsequently, a change C3 255, which was initiated at time T4 based on event E2b and is completed at time T5, brings the actual computing node quantity from seven to eight, as the replacement eighth computing node becomes available for use as part of the computing node group.

After the eight computing nodes of the computing node group operate in the intended manner for a portion of the aggregation time period 260a, another change C4 255 occurs in the actual computing node quantity 220 at approximately time T7, prompted by one of the computing nodes failing or otherwise becoming unavailable. A corresponding event E3 265 occurs at approximately the same time as the change C4, in which the PES terminates the unavailable computing node as needed, and optionally automatically initiates the providing of a replacement computing node. In particular, in a manner similar to that previously discussed with respect to event E2, the event E3 is separated in this example into two distinct events E3a and E3b (not shown separately) that occur at or near the same time. Thus, the PES records an event E3a at time T7 in this example that corresponds to the computing node being detected to have become unavailable, and the PES automatically initiates activities at time T7 to terminate the unavailable computing node, such as to directly cause the change C4. Furthermore, in this example, the termination of the unavailable computing node that occurs as the result of event E3a is itself treated as a separate event E3b that automatically initiates at approximately time T7 the immediate providing of a replacement computing node, although in other embodiments and situations, any such providing of a replacement computing node will instead be deferred until the harmonization activities H1 that are performed at the end of the aggregation time period 260a. Subsequently, in this example, a change C5 255 is completed at approximately time T9 that returns the actual computing node quantity to eight, directly caused by the event E3b, as the replacement computing node becomes available for use as part of the computing node group. In this example, the official recorded computing node quantity 225 is not temporarily updated to correspond to changes C4 and C5, nor to the previous changes C1-C3, although in other embodiments the official recorded computing node quantity 225 may be updated to reflect some or all such changes, such as to continuously or repeatedly maintain the official recorded computing node quantity 225 in a state that is reconciled with the updated actual computing node quantity 220. No other computing node capacity availability changes or events occur during the remainder of the aggregation time period 260a in this example, including none of the specified triggers 250 being satisfied, and no dynamically specified user instructions being received. Accordingly, at time T11 at the end of that time period 260a, a first set H1 of harmonization activities are considered, but no activities are needed, since the current desired, actual and official recorded computing node quantities 215, 220 and 225, respectively, are all matching at eight computing nodes. If the change C5 to replace the unavailable computing node had not been performed during the aggregation time period 260a as illustrated in this example, it would instead be initiated as part of the harmonization activities H1 after the aggregation time period in order to replace the unavailable computing node at that time (e.g., in conjunction with any other dynamic availability changes that are requested or initiated during the aggregation time period 260a).

During the second aggregation time period 260b, additional events do occur, however. In particular, an event E5 265 first occurs at approximately time T16, corresponding to an automated determination by the PES that trigger TR-1 250a has been satisfied by the increasing aggregate average CPU utilization 205a, as is graphically illustrated in the timeline graph 205 with a first black oval on the aggregate average CPU utilization 205a line. The trigger TR-1 satisfaction initiates a request to increase the desired computing node quantity 215 by 4 computing nodes, for a total requested desired computing node quantity 215c of twelve (or alternatively could request that the updated desired computing node quantity be set to twelve, regardless of the current desired computing node quantity). Similarly, after further additional time has passed, an event E6 265 next occurs at approximately time T18, corresponding to a determination that trigger TR-N 250c has been satisfied by the increasing aggregate average network bandwidth utilization 205b, as is graphically illustrated in the timeline graph 205 with a black oval on the aggregate average network bandwidth utilization 205b line. The trigger TR-N satisfaction initiates a request to increase the desired computing node quantity 215 by 2 computing nodes, for a total requested desired computing node quantity 215d of ten (or alternatively could request that the updated desired computing node quantity be set to ten, regardless of the current desired computing node quantity). After a short additional time has passed, an event E4 265 occurs at approximately time T19, in which the user associated with the computing node group provides a dynamically specified request to increase the desired computing node quantity 215 by 3 computing nodes, for a total requested desired computing node quantity 215b of eleven (or alternatively could request that the updated desired computing node quantity be set to eleven, regardless of the current desired computing node quantity). This request may be made, for example, based on the user noticing that the aggregate average CPU utilization 205a is high, that the total computing load on the computing node group is increasing, etc.

Finally, shortly before the end of the aggregation time period 260b, an additional change C6 occurs at approximately time T20, prompted by one of the computing nodes of the group failing or otherwise becoming unavailable. A corresponding event E9 occurs at approximately the same time as the change C6, in which the PES terminates the unavailable computing node as needed. In this example, rather than immediately initiating the providing of a replacement computing node, however, the PES determines to wait until the impending second set H2 of harmonization activities are initiated at time T21 (e.g., based on the small amount of time remaining until time T21, based on such deferral of providing replacement computing nodes being the default action for any computing nodes that become unavailable while in use, etc.), since it is possible that the quantity of computing nodes in the computing node group will be reduced based on those harmonization activities and the replacement computing node will not be needed. In other embodiments, the PES may instead immediately initiate the providing of the replacement computing node (e.g., based on not deferring the replacement of unavailable computing nodes in any circumstances; based on not deferring the replacement of unavailable computing nodes in this circumstance due to the desired computing node quantity being likely to increase rather than decrease as part of the harmonization activities H2; based on not deferring the replacement of unavailable computing nodes in this circumstance due to other factors, such as the user having already paid for eight computing nodes until later time T3; etc.). In this example, in a manner similar to that previously discussed with respect to events E2 and E3, the event E9 is separated into two distinct events E9a and E9b (not shown separately) that occur at or near the same time. Thus, the PES records an event E9a at time T20 in this example that corresponds to the computing node being detected to have become unavailable, and the PES automatically initiates activities at time T20 to terminate the unavailable computing node, such as to directly cause the change C6. Furthermore, in this example, the termination of the unavailable computing node that occurs as the result of event E9a is itself treated as a separate event E9b at approximately time T20 that initiates a request for an additional computing node for the group to use as a replacement computing node, such as to maintain the desired computing node quantity 215 at the desired quantity 215a of eight computing nodes. In this example, the request of event E9b is handled in a manner similar to events E4-E6, in being deferred until the harmonization activities H2 that will be performed at the end of the current aggregation time period 260b, although in other embodiments and situations such providing of a replacement computing node may instead be initiated immediately. In addition, in this example, the official recorded computing node quantity 225 is not updated to correspond to change C6, in a manner similar to that previously described with respect to changes C4 and C5, although in other embodiments the official recorded computing node quantity 225 may be updated to reflect such changes.

Accordingly, at the end of the second aggregation time period 260b, the harmonization activities H2 are initiated, and in this case do result in dynamic modifications to the computing node group. In particular, the PES in this example aggregates the requested modifications corresponding to the various requested desired computing node quantities 215b, 215c, 215d and 215a for events E4, E5, E6 and E9b, and determines to make a dynamic aggregated quantity modification to the prior desired computing node quantity 215a of eight, with the dynamic aggregated quantity modification in this example being an increase of four additional computing nodes (e.g., based on taking the largest of the requested quantity modifications), so as to correspond to an updated current desired computing node quantity 215e of twelve. In other embodiments, the dynamic aggregated quantity modification may be determined in other manners, such as to select the dynamic aggregated quantity modification so as to maintain the prior desired computing node quantity 215a in accordance with event E9b (e.g., to result in an increase of one computing node from the current actual computing node quantity), to take a smallest of the requested quantity modifications of events E4-E6 (e.g., to result in an increase of two computing nodes from the current desired computing node quantity), to take an average of the requested quantity modifications of events E4-E6 (e.g., to result in an increase of three computing nodes from the current desired computing node quantity), to take an accumulation of the requested quantity modifications of events E4-E6 (e.g., to result in an increase of nine computing nodes from the current desired computing node quantity), to take a highest priority of the requested quantity modifications of events E4-E6 (e.g., to result in an increase of three computing nodes from the current desired computing node quantity if, for example, the user instruction of E4 is considered to be higher priority than the trigger satisfactions of events E5 and E6), to take a first requested or last requested of the requested quantity modifications of events E4-E6 (e.g., to result in an increase of four or three computing nodes from the current desired computing node quantity, respectively), etc. In some embodiments and situations in which a user instruction event has higher priority than trigger satisfaction events (e.g., if the user instruction always overrides any requested dynamic modifications from trigger satisfaction events), the PES may further prevent additional trigger satisfaction events from occurring during an aggregation time period after a user instruction event is received, such as to in this example ignore (or never determine) any trigger satisfaction events that occur after the user instruction is received for event E4. Furthermore, in this example, the current actual and official recorded computing node quantities 220 and 225 differ, at seven and eight computing nodes, respectively, at the time of the harmonization activities H2. Therefore, as part of the harmonization activities H2, the PES initiates the providing of five additional computing nodes for the computing node group, to raise the current actual computing node quantity of seven to the new updated desired computing node quantity of twelve, and further updates the official recorded computing node quantity 225 to match the new updated desired computing node quantity of twelve. Thus, in this example, the capacity availability change of 5 computing nodes is indirectly caused by replacing the one computing node that became unavailable with respect to change C7, in accordance with event E9b, as well as by the increase of 4 additional computing nodes corresponding to the determined aggregated quantity modification from the events E4, E5 and E6.

During the third aggregation time period 260c, additional events and computing node capacity availability changes further occur. In particular, a change C7 is completed at approximately time T22, in which the currently available computing node quantity is increased by five to a total of twelve computing nodes, to reflect the five additional computing nodes whose availability was initiated at time T21, and with the actual computing node quantity 220 being updated accordingly. As is shown in timeline graph 205, the aggregate average CPU utilization 205a and the aggregate average network bandwidth utilization 205b both decrease after the change C7, with the aggregate average CPU utilization 205a dropping quickly. In particular, in this example, the aggregate average CPU utilization 205a eventually drops below a threshold of 20% corresponding to a criterion specified for trigger 250b, causing an event E8 to occur that includes a determination that trigger TR-3 250b has been satisfied, as is graphically illustrated in the timeline graph 205 with a second black oval on the aggregate average CPU utilization 205a line. The trigger satisfaction initiates a request to decrease the desired computing node quantity 215 by 2 computing nodes, for a total requested desired computing node quantity 215f of ten (or alternatively could request that the updated desired computing node quantity be set to ten, regardless of the current desired computing node quantity).

Finally, an additional change C8 occurs before the end of the aggregation time period 260c at approximately time T28, prompted by one of the computing nodes of the group failing or otherwise becoming unavailable. A corresponding event E10 occurs at approximately the same time as the change C8, in which the PES terminates the unavailable computing node as needed. In a manner similar to that for change C6, the PES opts in this example to wait until the third set H3 of harmonization activities are initiated at time T31 rather than immediately initiate a replacement for the unavailable computing node (e.g., since event E8 makes it possible or likely that the desired quantity of computing nodes in the computing node group will be reduced then), although in other embodiments the PES may instead immediately initiate the providing of the replacement computing node. In particular, in a manner similar to that previously discussed with respect to events E2, E3 and E9, the event E10 is separated into two distinct events E10a and E10b (not shown separately) in this example that occur at or near the same time. Thus, the PES records an event E10a at time T28 in this example that corresponds to the computing node being detected to have become unavailable, and the PES automatically initiates activities at time T28 to terminate the unavailable computing node, such as to directly cause the change C8. Furthermore, in this example, the termination of the unavailable computing node that occurs as the result of event E10a is itself treated as a separate event E10b at approximately time T28 that initiates a request for an additional computing node for the group to use as a replacement computing node, such as to maintain the desired computing node quantity 215 at the desired quantity 215e of twelve computing nodes. In this example, the request of event E10b is handled in a manner similar to event E9b, in being deferred until the harmonization activities H3 that will be performed at the end of the current aggregation time period 260c, although in other embodiments and situations such providing of a replacement computing node may instead be initiated immediately. In addition, in this example, the official recorded computing node quantity 225 is not updated to correspond to change C8, in a manner similar to that previously described with respect to changes C4-C6, although in other embodiments the official recorded computing node quantity 225 may be updated to reflect such changes.

Accordingly, at the end of the third aggregation time period 260c, the harmonization activities H3 are initiated, and do result in changes to the computing node group. In particular, the PES in this example aggregates the requested modifications corresponding to events that have occurred during the time period 260b, which in this example is only event E8 and E10b, and determines to make a dynamic aggregated quantity modification to the prior desired computing node quantity 215e of twelve, which in this example is a decrease of two computing nodes, so as to correspond to an updated current desired computing node quantity 215g of ten. Furthermore, the current actual and official recorded computing node quantities 220 and 225 differ, at eleven and twelve computing nodes, respectively, at the time of the harmonization activities H3. Therefore, as part of the harmonization activities H3, the PES initiates a change in the current official computing node quantity of twelve to reach the current desired actual computing node quantity of ten, in light of the current actual computing node capacity of eleven, so as to remove one of the existing computing nodes from the computing node group (e.g., to terminate the execution of the program on the removed computing node, optionally after completing some or all actions that it has already begun, and to make that computing node available for other future use by other users). Thus, in this example, the capacity availability change of removing one of the existing computing nodes at time T31 is indirectly caused by the terminating of the one group computing node with respect to event E10b, as well as by the requested decrease of 2 computing nodes corresponding to the event E8. The PES further updates the official recorded computing node quantity 225 to match the new updated desired computing node quantity of ten. Shortly after time T31, a final change C9 is completed at approximately time T32, in which the currently available computing node quantity is decreased by one to a total of ten computing nodes, to reflect the computing node whose removal from the computing node group was initiated at time T31, and with the actual computing node quantity 220 being updated accordingly. In other embodiments, the change C9 may occur substantially immediately at time T31 upon the determination to make the change, such as if the computing node to be removed is immediately withdrawn from further activities for the computing node group, even while the removed computing node is temporarily executing and available to continue performing operations.

In addition, while the harmonization activities H1, H2 and H3 are illustrated in this example as occurring at a single point in time, it will be appreciated that some or all harmonization activities may actually take place over a period of time, and further may have other effects that last over a period of time. For example, in at least some embodiments, some or all changes to program execution capacity of a computing node group that are initiated by the PES may result in a temporary lockdown period in which at least some other types of events or changes may not be allowed. The PES-indicated program execution capacity changes that may cause such a lockdown may include, for example, program execution capacity increases and/or decreases that are initiated as part of the harmonization activities (e.g., to add new computing nodes, to remove existing computing nodes, etc.), and/or program execution capacity changes that are initiated immediately in response to a PES determination (e.g., a computing node failure, receipt of a user instruction, satisfaction of a user-specified trigger, etc.). Such lockdowns may have durations of various types (e.g., until a specified result or occurrence, such as until a computing node being added has become available; a specified length of time, such as the average or expected time for a computing node being added to become available; etc.), and in some embodiments may vary based on the type of PES-initiated change. During such lockdowns, at least some types of events or changes may not be allowed, such as to not allow user-specified triggers to be satisfied (or by ignoring any such trigger satisfactions) during the lockdown duration, and/or to not allow user instructions to be accepted (or by ignoring any such user instructions) during the lockdown duration. Furthermore, in some embodiments, a user associated with a computing node group may similarly specify a cooldown period that operates in a similar manner to that of a lockdown, such as a cooldown period of a specified amount of time that follows a lockdown, or instead takes effect at other times. As with the lockdown, during the cooldown period, at least some types of events or changes may not be allowed, such as to not allow user-specified triggers to be satisfied (or by ignoring any such trigger satisfactions) during the cooldown period. It will be appreciated that users and/or the PES may control modifications to computing node groups in other manners in other embodiments.

Thus, in this manner, the PES operates to manage the program execution capacity provided to a user by a group of computing nodes, including to make various dynamic modifications to the computing node group based on a variety of circumstances. It will be appreciated that the events and changes illustrated in FIG. 2A are provided for illustrative purposes only, and that actual events, changes and other operations of the PES may differ in other embodiments and situations.

FIG. 2B illustrates an example of techniques for automatically attributing causation information to the dynamic computing node quantity modifications previously discussed with respect to FIG. 2A, such as techniques that may be automatically performed by an embodiment of a PESSM module. In particular, FIG. 2B illustrates two example database table data structures that store information corresponding to some of the information illustrated in FIG. 2A, with the example table 280 of FIG. 2B storing various information related to the example computing node capacity availability changes that occurred to the example computing node group of FIG. 2A (referred to as "Group1" in FIG. 2B), and with example table 290 of FIG. 2B storing various information related to the example events that occurred for the example computing node group Group1 of FIG. 2A.

Example table 280 includes a variety of rows or entries 285a-285k that each corresponds to one of the example changes C1-C10 discussed with respect to FIG. 2A, with various fields or columns 280a-280x illustrated for each row. In particular, in this example, each row includes a unique identifier ("ID") 280a, an ID 280b of the applicable computing node group to which the change corresponds, a type 280c of the program execution capacity change, an indication 280d of the intended result of the program execution capacity change, various details 280e about the change, start and end times 280f and 280g of the change, an aggregation time period 280h during which the change takes place or otherwise with which the change is associated (which in this example is referred to based on the harmonization activities performed at the end of the aggregation time period), a change-event nexus ID 280x, and optionally various other information. As one illustrative example, row 285a corresponds to change C1 for Group1, which corresponds to a change in the computing node quantity of Group1 involving an increase of 4 computing nodes that is completed at time T02 during aggregation time period H1. The other rows include similar information.

Example table 290 includes a variety of rows or entries 295a-295m that each corresponds to one of the example events E1-E10 discussed with respect to FIG. 2A, with various fields or columns 290a-290x illustrated for each row. In particular, in this example, each row includes a unique identifier ("ID") 290a, an ID 290b of the applicable computing node group to which the event corresponds, a type 290c of the event, information 290d about the source of the event, a time 290e of the event, an aggregation time period 290f during which the event takes place or otherwise with which the event is associated (which in this example is referred to based on the harmonization activities performed at the end of the aggregation time period), a change-event nexus ID 290x, and optionally various other information (e.g., a particular user associated with received user instructions). As one illustrative example, row 295h corresponds to event E4 for Group1, which corresponds to a received user instruction at time T19 during aggregation time period H2 that requests that the desired computing node quantity of Group1 be increased by 3 computing nodes. The other rows include similar information.

In the example of FIG. 2B, the change-event nexus ID information 280x and 290x of tables 280 and 290 reflects causation information that is attributed to reflect relationships between changes and events. In particular, in this example, if rows in the tables 280 and 290 share a common value for the change-event nexus ID information 280x and 290x, it reflects attributed causation between the corresponding events and changes. As one example, as previously discussed with respect to FIG. 2A, event E3b corresponds to the providing of a replacement computing node for a computing node that became unavailable, which is directly attributable to change C5 corresponding to the resulting addition of a computing node to the group. Accordingly, row 295e (corresponding to event E3b) and row 285g (corresponding to change C5) share a common nexus identifier.

Conversely, change C7, which corresponds to adding five computing nodes that is initiated during the harmonization activities H2, does not have a single event that is directly attributable to that change. In particular, events E4, E5 and E6 each requested dynamic modifications to Group1, which were aggregated and used in combination to prompt the adding of four of the five computing nodes for change C7. As such, rows 295f-295h (corresponding on events E4-E6) and row 285i (corresponding to change C7) all share a common nexus identifier. Furthermore, in the example of FIG. 2A, one of the five computing nodes that was added as part of change C7 was a replacement node for the computing node that became unavailable with respect to change C6, with the initiation of the replacement computing node corresponding to event E9b. Accordingly, row 295j (corresponding to event E9b) and row 285i (corresponding to change C7) also share the same common nexus identifier. In other embodiments, if the providing of the replacement computing node was initiated in event E9b separately from the providing of the four additional computing nodes corresponding to events E4-E6, such as to immediately replace the unavailable computing node, the corresponding change for that would occur before the end of time period 260b and the resulting harmonization activities H2, and would be shown separately in table 280 with event E9b and that additional change sharing a distinct corresponding nexus identifier. In addition, while the five computing nodes that are added for change C7 are shown in an aggregated manner in a single row in table 280, in order embodiments each computing node being added may be represented in a separate row 285 of the table 280, and if so would each share the same nexus identifier N7 that is currently illustrated for only row 285i of aggregated change C7.

Furthermore, in this example, changes are tracked in table 280 that correspond not only to dynamic modifications to computing node quantity based on dynamic user instructions and/or satisfied user triggers, but also based on inadvertent changes to computing node quantity (e.g., due to computing nodes failing or otherwise becoming unavailable). Such changes are detected based on monitoring activities, and are illustrated as events that trigger additional changes (e.g., the providing of replacement computing nodes), although in other embodiments may be handled in other manner, such as to not track such changes and/or to not treat system-initiated replacement activities as events. Furthermore, while the change-event nexus information in the tables 280 and 290 does not distinguish between changes that are directly attributable to one or more corresponding events (e.g., events that cause those changes to be initiated immediately) and changes that are indirectly attributable to one or more corresponding events (e.g., events that are aggregated together and in combination cause those changes to be initiated, such as during harmonization activities), in other embodiments such information may further be tracked.

As previously noted, the attribution of responsibility for particular dynamic program execution capacity modifications to a computing node group may provide various benefits, including in providing explanations to a user associated with the computing node group of why changes occurred. Such responsibility attribution information may further be generated and/or used in response to various types of queries received from users or other sources, such as a request to identify which event(s) are the cause of a particular indicated program execution capacity modification or other change in availability of one or more computing nodes of a group, and/or of which program execution capacity modification(s) or other computing node group availability change(s) are caused by one or more indicated events. As discussed with respect to FIG. 2B, the nexus information illustrated in tables 280 and 290 provides one mechanism for tracking and providing responsibility attribution information. For example, with respect to the addition of 5 computing nodes corresponding to change C7 in FIG. 2A, the user may want to know why 5 computing nodes were added (e.g., particularly in light of the user instruction of event E4 to add 3 computing nodes). By using the nexus information illustrated in FIG. 2B, the PES or other system may easily automatically generate a human-readable explanation. For example, in response to a user request as to the cause of adding the four computing nodes corresponding to change C1 of FIG. 2A, the PES or other system may, for example, indicate the following: "Change C01 was directly caused by event E01 at time T1. Event E01 was a request from User UUU to initiate a group of 8 computing nodes." This information may be generated based on using the nexus information 280x from row 285a corresponding to change C1 to identify row 295a of the table 290 corresponding to event E1, and extracting and formatting information from rows 285a and 295a in a desired manner (e.g., in a format based on the user request or prior user preferences, in a format based on PES defaults, etc.). Similarly, in response to a user request as to the effect of the user instruction E1 to initiate the group of eight computing nodes, the PES or other system may, for example, indicate the following: "Event E01 at time T1 directly caused Changes C01, C02 and C03. Change C01 was the addition of 4 computing nodes that was initiated at time T1 and ended at time T2. Change C02 was the addition of 3 computing nodes that was initiated at time T1 and ended at time T3. Change C03 was the addition of 1 computing node that was initiated at time T1 and did not complete." As another example, in response to a user request as to the cause of adding the five computing nodes corresponding to change C7 of FIG. 2A, the PES or other system may, for example, indicate the following: "Change C07 was indirectly caused by events E05, E06, E04 and E09b that occurred during the time period from T11 to T21. Event E05 was a request for 4 additional computing nodes based on satisfaction of trigger TR-1. Event E06 was a request for 2 additional computing nodes based on satisfaction of trigger TR-N. Event E04 was a request for 3 additional computing nodes based on a dynamic user-supplied instruction from User UUU. Event E09b was a request for 1 replacement computing node based on the automated termination of a computing node of the group that became unavailable." In addition to or instead of such text strings, responsibility attribution information may further be generated in various other forms, such as automated reports (e.g., in tables, charts, etc.), and in a periodic or other scheduled manner. It will be appreciated that such responsibility attribution information may be generated and used in a variety of other manners in other embodiments.

It will be appreciated that the information regarding events and changes illustrated in FIG. 2B is provided for illustrative purposes only, and that the information that is stored and the storage of such information may be performed in a variety of other manners in other embodiments. Furthermore, the PES may store a variety of additional types of information about users and computing node groups in other embodiments, such as to have additional tables that store information about user-defined triggers, about monitored performance measurement information, about user accounts, etc.

In addition, the preceding examples of FIGS. 2A and 2B are provided for illustrative purposes, and other embodiments may differ in various ways from the examples. For example, although the program execution capacity is measured and modified based on a quantity of computing nodes in these examples, such as if the various available computing nodes are treated as being equivalent (e.g., having equivalent computing resources), other embodiments may be provided where various of the available computing nodes may be of different types with varying characteristics (e.g., different amounts of processing capacity, memory, platform specification, etc.), and/or in which program execution capacity is tracked in manners other than computing node quantity. In some such embodiments, various of the requests may include indications of one or more specific types of the computing nodes for use in groups of computing nodes selected to execute programs associated with the requests, and those requests may only be fulfilled on the corresponding specified type of computing node.

In addition, in at least some embodiments, a PES or other system may further perform other types of activities as part of managing groups of computing nodes. For example, as previously noted, the PES or other system may determine to add or remove computing nodes from a computing node group at various times, including the following: during harmonization activities at the end of an aggregation period of time in response to one or more triggers satisfied during the time period and/or user instructions received during the time period; at any time in response to a user instruction or trigger satisfaction that is specified or determined to have immediate effect; at any time in response to automated activities of the PES or other system, such as to replace a failed computing node and/or to terminate and remove a computing node whose ongoing operation is inhibited; etc. In at least some embodiments, the PES or other system may further consider other factors when determining the exact timing for at least some such computing node group modifications. For example, in situations in which a user will be held responsible for the use of a given quantity of computing nodes for a given period of time (e.g., has already been charged for X computing nodes for the next hour), such information may be used to determine timing related to at least some types of modifications to the computing node group. If the PES or other system determines to reduce the quantity of computing nodes in the group below X, the PES or other system may determine to wait until near or at the end of the given time period (e.g., the end of the hour for which the user has already been charged) before actually reducing the computing node quantity below X. Similarly, if a computing node of a group fails near the time when new harmonization activities will be performed (e.g., near the end of a period of time during which requested computing node quantity modifications are being aggregated), the PES or other system may determine to update the actual node quantity and optionally the official recorded node quantity to reflect the failure, but to not immediately initiate the addition of a replacement computing node—in this manner, if the aggregation of the requested computing node quantity modifications during the harmonization activities determine to reduce the computing node quantity for the group by one or more computing nodes, the failed computing node may be used as one such reduction rather than terminating an executing computing node of the group.

In some embodiments, the PES or other system may manage multiple distinct types of modifications for a computing node group simultaneously. As one example, a computing node group may be being managed at a current desired computing node quantity using computing nodes at a single location, but the user may decide to specify a second type of metric for the computing node group, such that a specified desired subset of the computing nodes of the group be located at a distinct second location. If so, the PES or other system may operate to meet the desired value for the second metric in various manners, including by incrementally adding any new computing nodes to the group at the second location and incrementally removing any existing computing nodes from the group at the first location until the desired value for the second metric is achieved, or alternatively immediately terminating existing computing nodes from the group at the first location to enable replacement computing nodes to be added to the group at the second location. Such incremental additions and/or removals may be triggered in any of the manners discussed in greater detail elsewhere, including to replace unavailable computing nodes, modify computing node quantity in response to dynamically specified user instructions and/or satisfied user-specified triggers, etc. In addition, while computing node quantity and location are simultaneously being balanced in this example, a variety of other types of changes may be performed in a similar manner (e.g., to change existing computing nodes from a first type to a second type, such as based on the different types having differing associated amounts of computing resources). Furthermore, while program execution capacity modifications are made in some examples by changing computing node quantity, in other embodiments such capacity modifications may be made by changing the program execution capacity of one or more computing nodes of the group (e.g., by replacing a first computing node with a second computing node that has more or less of one or more types of computing resources of interest, by modifying the amount of one or more computing resources that are available to one of the computing nodes that are already part of the group, etc.).

As previously discussed, various types of functionality may be provided and used by a PES in various embodiments, and the functionality may be provided in various ways. For example, in some embodiments, program execution capacity available from a PES may include multiple computing nodes for executing programs on behalf of users, such as via multiple physical computing machines interconnected via one or more networks or other data exchange mediums that are capable of transmitting data between the computing machines. At least some of the computing machines may in some embodiments each include sufficient computing-related resources to execute multiple programs simultaneously (e.g., sufficient writeable memory, non-volatile storage, CPU cycles or other CPU usage measure, network bandwidth, swap space, etc.), and at least some of the computing machines in some such embodiments may each host multiple virtual machine computing nodes that each may execute one or more programs on behalf of a distinct user. Furthermore, in various embodiments, a PES may execute various types of programs on behalf of multiple users. For example, such programs executed on behalf of users may include one or more operating systems, applications (e.g., servers and/or other software applications), utilities, libraries, etc. In addition, in at least some embodiments, such programs may include executable software images, such as virtual machine images that are bootable or otherwise loadable on one or more virtual machine computing nodes, and that each may include operating system software, software for one or more application programs, and/or configuration information, etc.

In at least some embodiments, the execution of one or more programs on a group of one or more computing nodes by a PES may be initiated in response to a current execution request for immediate execution of those programs. Alternatively, the initiation may be based on a previously received program execution request that scheduled or otherwise reserved the then-future execution of those programs for the now-current time. Program execution requests may be received in various ways, such as directly from a user (e.g., via an interactive console or other GUI provided by the program execution service), or from an executing program of a user that automatically initiates the execution of one or more other programs or other instances of itself (e.g., via an API provided by the program execution service, such as an API that uses Web services). Program execution requests may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.), as well as a variety of other types of preferences and/or requirements for execution of one or more programs (e.g., resource allocation, geographical and/or logical location for execution, proximity of execution to other programs and/or computing nodes, timing-related criteria, etc.).

After receiving a request to execute one or more instances of a program at an indicated time, the PES may determine one or more computing nodes to use in a group for executing the program instances. In some embodiments, the determination of the computing nodes to be used is performed at the time of the request even if for future execution. In other embodiments, the determination of the computing nodes to be used for future execution of one or more program instances may be deferred to a later time, such as at the future time of execution based on information that is then available. In some embodiments, the determination of which computing nodes to use for execution of one or more programs on behalf of a user may be made prior to a request to execute, such as at a time when a user subscribes and/or registers to use the PES, and/or at another time prior to a request to execute programs for a user. For example, in some such embodiments, one or more computing nodes may be associated with a user for a period of time, such that programs may be executed on behalf of that user on the associated computing nodes at any time during that period, such as at any time a request is received to execute software for the user during the period. In addition, in some embodiments, the determination of which computing nodes to use to execute programs on behalf of a user may be made when one or more computing nodes and/or computing resources of one or more computing nodes become available for executing programs for the user, such as, for example to execute programs of one or more pending requests on one or more computing nodes at a time when the computing nodes are unused and/or are otherwise available for executing the programs.

The determination of which computing nodes to use for execution of each program copy or instance may be made in a variety of ways, including based on any preferences and/or requirements specified in the request or otherwise specified for the program and/or associated user (e.g., at a time of registration, etc.). For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a PES, such that the PES may execute programs on behalf of a user in exchange for payment of one or more fees by that user. For example, in some embodiments, fees may be charged to a user based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc. In at least some embodiments, as discussed in more detail below, fees may be based on various other factors, such as various properties related to executing programs (e.g., continuity of execution, fault tolerance, etc.). In at least some embodiments, a provider of a PES may offer one or more of various tiers, types and/or levels of services or functionality for executing programs on behalf of multiple users, and in some such embodiments, various fees may be associated with the various tiers, types and/or levels of services. In addition, for example, tiers may be used for a specific type of functionality provided by a PES, such as to charge fees at a first tier for a first quantity of program execution capacity functionality (e.g., up to a specified first threshold of computing nodes being used), to charge fees at a second tier (e.g., a lower price tier) for a second quantity of program execution capacity functionality (e.g., above the specified first threshold and up to a specified second threshold of computing nodes being used), etc. Additional details related to various fees associated with a program execution service are included in pending U.S. patent application Ser. No. 11/963,331, filed Dec. 21, 2007 and entitled "Providing Configurable Pricing for Execution of Software Images," which is hereby incorporated by reference in its entirety.

Furthermore, various other types of functionality may be provided and used by a PES in various embodiments, as discussed in greater detail elsewhere.

FIG. 3 is a block diagram illustrating an example embodiment of a system suitable for performing techniques to manage groups of computing nodes for multiple users. In particular, FIG. 3 illustrates a server computing system 300 suitable for providing at least some functionality of a program execution service, as well as various client computing systems 350 that may be used by users of the program execution service, computing nodes 360 that may be used by the program execution service, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352, storage 354, and memory 357. The other computing systems 380 and computing nodes 360 may also each include components that are similar to some or all of the components illustrated with respect to server computing system 300, but such components are not illustrated in this example for the sake of brevity.

An embodiment of a Program Execution Service System Manager module 340 is executing in memory 330, and it interacts with computing systems 350 and 380 and computing nodes 360 over the network 390 (e.g., via the Internet and/or the World Wide Web, via a private cellular network, etc.). In this example embodiment, the PESSM 340 includes functionality related to managing use of multiple computing nodes 360 by various users (not shown) interacting with user computing systems 350, such as in conjunction with a program execution service managed by the PESSM 340. The other computing systems 350 and 380 and computing nodes 360 may be executing various software as part of interactions with the PESSM. For example, user computing systems 350 may be executing software in memory 357 to interact with PESSM 340 (e.g., as part of a Web browser or specialized client-side application program), such as to configure and/or request execution of programs on behalf of the users of those systems on one or more computing nodes 360 in various ways, as well as to perform various other types of actions, as discussed in greater detail elsewhere. Various information related to the functionality of the PESSM module 340 may be stored in storage 320, such as information 322 related to configuration, execution and/or registration for executing programs on behalf of multiple users, information 324 related to program execution capacity modifications for computing node groups (e.g., information about predefined user-specified triggers; information about dynamically specified capacity modification instructions from users; information about computing node performance measurements and other information related to determining if specified triggers are satisfied; current values for desired, actual and official recorded computing node quantities for groups; etc.), and information 326 related to attribution of causation for particular program execution capacity modifications for particular computing node groups (e.g., by listing at least some events that occur and at least some changes to computing nodes of groups, and associating particular events with particular changes, such as in a manner similar to that discussed in FIG. 2B and elsewhere).

After the PESSM module 340 receives requests (or other indications) to execute one or more programs on a group of one or more computing nodes 360, the PESSM module 340 selects the one or more computing nodes for the group, and initiates execution of those programs on those computing nodes 360. In addition, the PESSM module 340 may further interact with computing nodes 360 to later terminate execution of initiated programs on the computing nodes, to migrate one or more of the programs to one or more other computing nodes 360 or computing systems 380, etc. The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the PESSM module 340 may interact with one or more other computing systems 380 to initiate or terminate execution of one or more programs on those computing systems, such as if the computing systems 380 are provided by one or more third-party participants who are providing computing nodes for use by other users. In some embodiments, the PESSM module 340 may further or instead manage access to one or more types of computing-related resources or services other than program execution services (e.g., persistent or temporary data storage services, messaging services, database services, etc.).

In addition, an embodiment of a Program Execution Service Capacity Maintenance Manager module 345 is executing in memory 330, and it interacts in this embodiment with computing nodes 360 over the network 390. In particular, in this example embodiment, the PESCMM module 345 includes functionality related to monitoring or otherwise interacting with one or more of the computing nodes 360 to track use of those computing nodes, such as to determine current actual program execution capacity of a computing node group and/or to determine current performance characteristics corresponding to some or all computing nodes of a computing node group. As previously noted, such information may be stored on storage 320 and/or elsewhere, and may be used by the modules 340 and 345 in various manners. For example, in some embodiments, if the module 345 discovers that a computing node has failed or otherwise become unavailable (e.g., as part of provisioning or otherwise initializing the computing node to be used as part of a computing node group, after the computing node has been in use as part of a computing node group, etc.), the module 345 may automatically take actions to replace the unavailable computing node with a new computing node. In other embodiments, the module 345 may instead not perform some or all of the monitoring of the computing nodes, such as if the module 345 instead obtains information from another source about current actual program execution capacity of a computing node group and/or current performance characteristics corresponding to some or all computing nodes of a computing node group, and then uses that information to maintain program execution capacity for the computing node group as appropriate.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules 340 and/or 345 may in some embodiments be distributed in additional modules. Similarly, in some embodiments some of the functionality of the modules 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
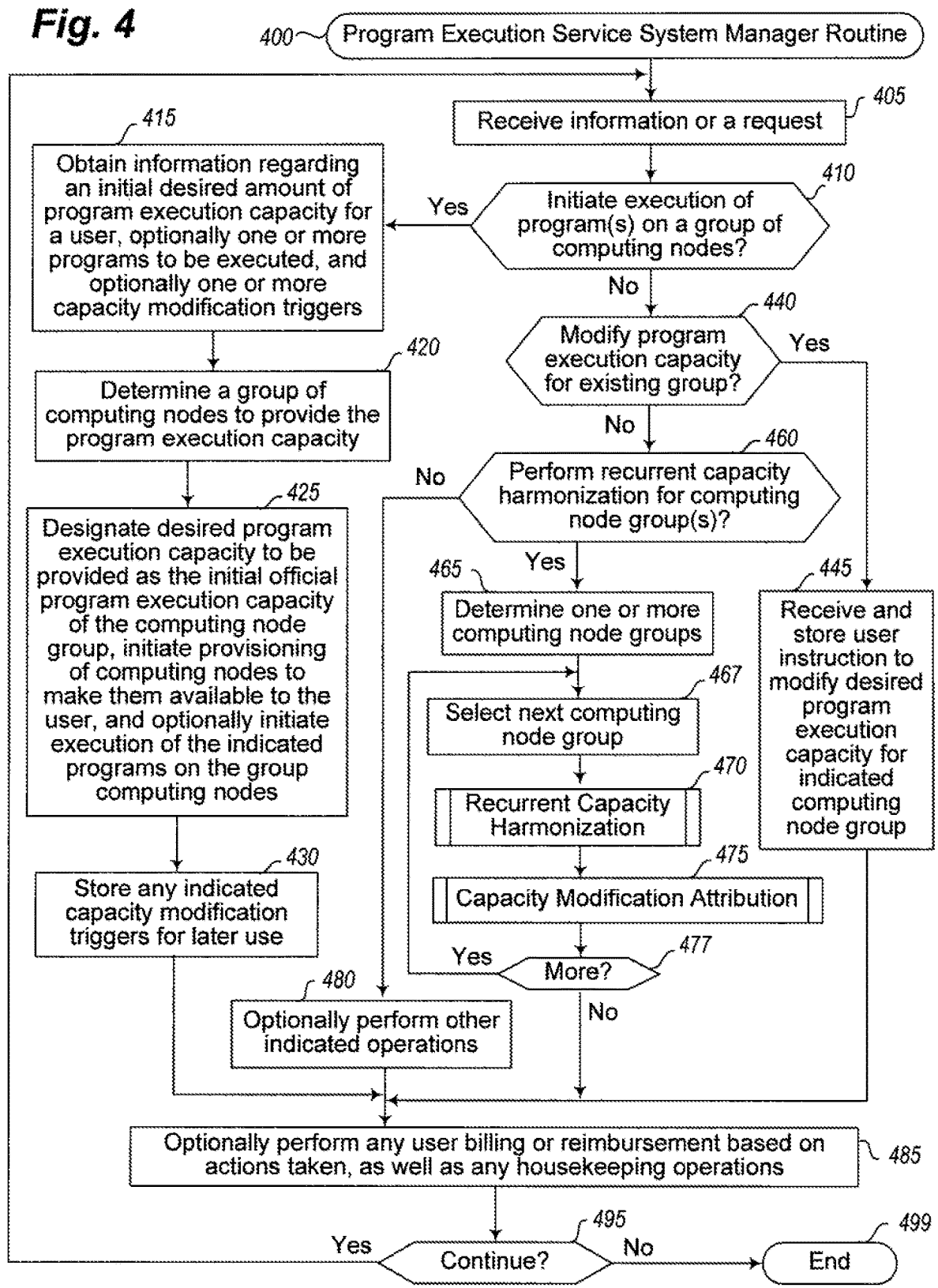
FIG. 4 illustrates a flow diagram of an example embodiment of a Program Execution Service System Manager routine.

FIG. 4 is a flow diagram of an example embodiment of a Program Execution Service System Manager routine 400. The routine may be provided by, for example, execution of the PESSM modules 110 and 180 of FIGS. 1A and 1B, respectively, and/or the PESSM module 340 of FIG. 3, such as to assist in managing use of groups of computing nodes for users, as well as to perform other types of management operations in some situations. In this illustrated embodiment, the routine 400 manages various aspects of use of a program execution service that provides program execution capacity for executing programs on behalf of multiple users.

In the illustrated embodiment, the routine begins at block 405, where information or a request is received. The routine continues to block 410 to determine if the received request or information is related to initiating execution of one or more programs on a group of computing nodes, such as a request from a user. If so, the routine continues to block 415 to obtain information regarding the requested program execution, such as an initial desired amount of program execution capacity for the computing node group (e.g., a desired computing node quantity), optionally one or more programs to be executed, and optionally one or more user-specified capacity modification triggers. As discussed elsewhere, in some embodiments, a user may select from one or more of various types of computing nodes and/or may otherwise specify various amounts and/or types of computing resources desired (e.g., processing unit type/amount, memory amount, platform specification, etc.). In block 420, the routine then selects the computing nodes to be used for the group, and in block 425 initiates making those selected computing nodes available for the user, such as by provisioning the selected computing nodes and optionally initiating execution of the one or more programs to be executed. The routine also designates the desired program execution capacity of the selected computing nodes of the group as the initial official recorded program execution capacity for the group. When the computing nodes are available for use on behalf of the user, the user may be notified of the availability in various manners, or in other embodiments the computing nodes may operate in an automated manner without further interaction by the user. The routine then continues to block 430 to store information related to the computing node group, including any user-specified triggers for the group.

If it is instead determined at block 410 that a request to initiate execution of a group of computing nodes is not received, the routine instead continues to block 440 to determine whether a request is received related to modifying program execution capacity for an existing computing node group. If so, the routine continues to block 445 to receive and store a dynamically specified user instruction related to modifying program execution capacity for an indicated existing computing node group. In the illustrated embodiment, the user instruction may be aggregated with other possible program execution capacity modification requests that occur during a current aggregation time period, and further processed during a next time that harmonization activities are performed, such as with respect to blocks 465-477, although in other embodiments at least some such user-specified modification requests may instead be performed immediately.

If it is instead determined at block 440 that a request to modify program execution capacity for a group of computing nodes is not received, the routine instead continues to block 460 to determine whether to currently perform periodic or otherwise recurrent harmonization activities with respect to the program execution capacity for one or more computing nodes groups, such as at the end of a period of time of aggregation of program execution capacity modification requests for such a computing node group. If so, the routine continues to block 465 to determine one or more computing node groups for which to currently perform harmonization activities (e.g., computing node groups for which an aggregation period of time has ended and for which one or more dynamic program execution capacity modifications have been aggregated), and in block 467 selects the next determined computing node group, beginning with the first. The routine then continues to block 470 to execute a routine to perform recurrent capacity harmonization activities, with one example of such a routine being described in greater detail with respect to FIG. 5. The routine next continues to block 475 to execute a routine to perform activities related to attribution of causation for program execution capacity modifications that are performed in block 470, with one example of such a routine being described in greater detail with respect to FIG. 6. After block 475, the routine continues to block 477 to determine whether there are more determined computing node groups to process, and if so the routine returns to block 467 to select the next such determined computing node group.

If it is instead determined at block 460 not to currently perform periodic or otherwise recurrent harmonization activities with respect to the program execution capacity for one or more computing nodes groups, the routine instead continues to block 480 to optionally perform one or more other indicated operations. Such operations may include, for example, one or more of the following: user requests related to performing other types of program execution (if the provided program execution service provides such other program execution types), such as to execute a single program on a single computing node; user-specified program execution capacity modification requests that are to be performed immediately (e.g., a user instruction to terminate execution of a particular indicated computing node, such as if the computing node is not operating properly); user requests to specify additional triggers or otherwise to modify configuration information for an indicated computing node group; user requests to immediately perform harmonization activities with respect to an indicated computing node group, such as in addition to or instead of recurrent harmonization activities (e.g., if harmonization activities are performed only upon user request); user requests to obtain various status information related to one or more computing node groups with which the user is associated; requests to perform administrative-related activities for a user, such as subscription, registration, or payment operations; etc.

After blocks 430, 445, or 480, or if it is instead determined in block 477 that additional determined computing node groups are not available, the routine continues to block 485 to optionally perform any user billing (or reimbursement) activities based on the information or request received in block 405 or as is otherwise initiated (e.g., periodically), such as to charge and/or collect fees from one or more users based on program execution functionality provided to the users. The routine may further optionally perform periodic housekeeping operations as appropriate.

After block 485, the routine continues to block 495 to determine whether to continue, such as until an explicit indication to terminate execution of the routine. If it is determined to continue, the routine returns to block 405, and if not continues to block 499 and ends. It will be appreciated that additional types of activities may be performed in some embodiments and situations, such as to determine whether users are authorized to perform particular requested operations, to immediately obtain payment from users for some types of requested operations, etc. In addition, while user requests and other operations are indicated in the illustrated embodiment as being performed in a manner specific to a particular computing node group and a particular associated user, in other embodiments some or all such operations may instead be applied more generally, such as to multiple computing nodes groups associated with a single user and/or from multiple users associated with one or more computing node groups.

Figure 5:
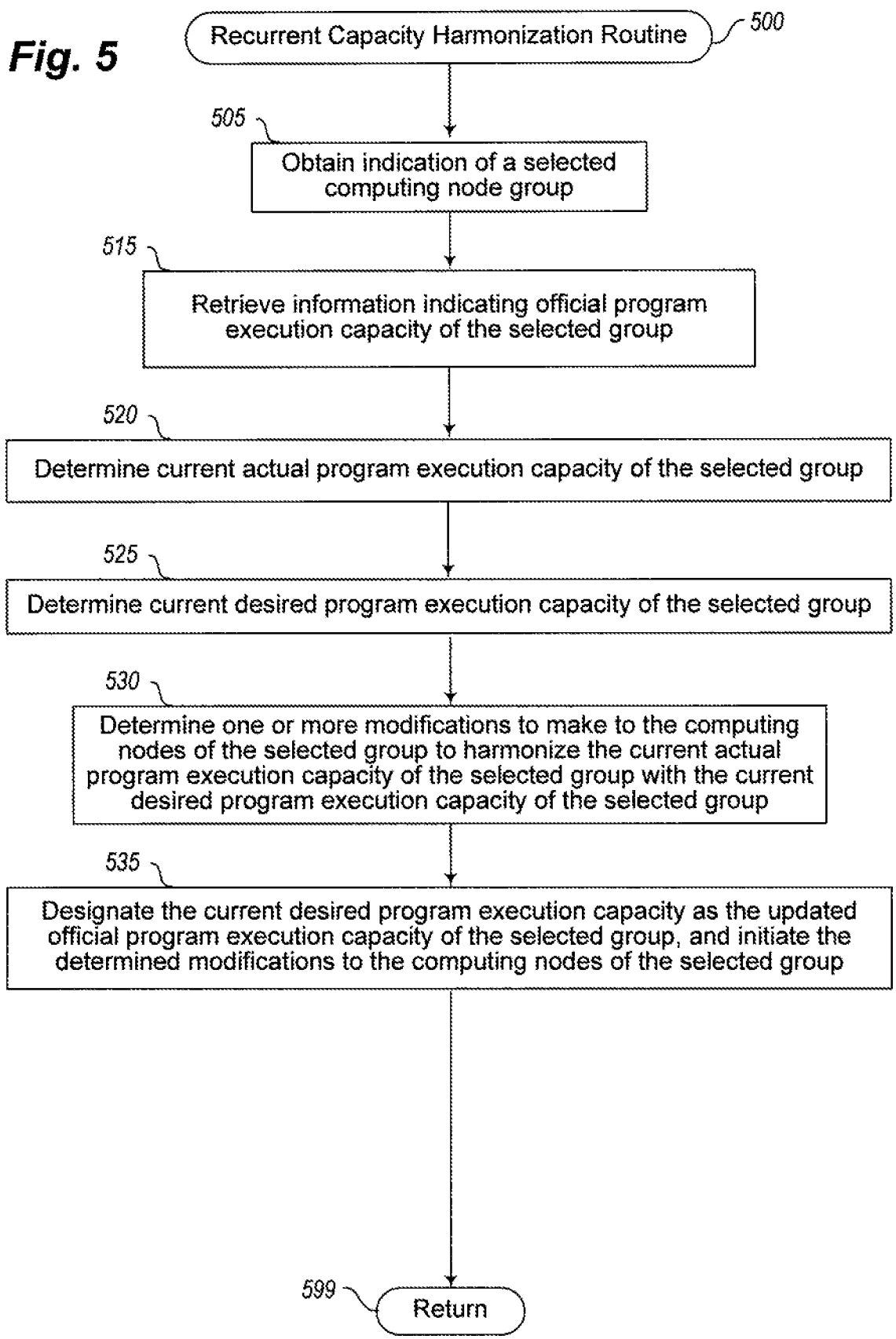
FIG. 5 illustrates a flow diagram of an example embodiment of a Recurrent Capacity Harmonization routine.

FIG. 5 is a flow diagram of an example embodiment of a Recurrent Capacity Harmonization routine 500. The routine may be provided by, for example, execution of the PESSM modules 110 and 180 of FIGS. 1A and 1B, respectively, and/or the PESSM module 340 of FIG. 3, such as may be initiated from block 470 of routine 400 in FIG. 4.

In the illustrated embodiment, the routine begins in block 505, where it obtains an indication of the currently selected computing node group for which capacity harmonization activities are to be performed. In block 515, the routine then retrieves information about the official recorded program execution capacity for the selected computing node group, such as based on the prior harmonization activities performed for the selected computing node group (or the initial official recorded program execution capacity for the selected computing node group if this is the first harmonization activities that are performed), and/or based on subsequent modifications to the official recorded program execution capacity that may be performed by a PES Capacity Maintenance Manager module (e.g., as described in greater detail with respect to FIG. 7). The routine then continues to blocks 520 and 525 to determine the current actual and current desired program execution capacities of the selected computing node group, respectively. The determining of the current actual program execution capacity may include, for example, retrieving information that was previously stored by a PES Capacity Maintenance Manager module as part of monitoring the selected computing node group, although in other embodiments the routine 500 may dynamically determine the current actual capacity (e.g., by dynamically requesting a PES Capacity Maintenance Manager module or other monitoring source to provide that information).

The determining of the current desired program execution capacity in block 525 may include, for example, retrieving information regarding any dynamically specified capacity modification instructions that have been received from an associated user for the selected computing node group during the current aggregation period of time to which the harmonization activities correspond (e.g., as previously discussed with respect to block 445 of FIG. 4), and regarding any user-specified triggers for the selected computing node group that have previously been determined to have been satisfied during the current aggregation period of time. Alternatively, in some embodiments, the routine may instead retrieve determined performance characteristics information for the selected computing node group (e.g., information that was previously stored by a PES Capacity Maintenance Manager module as part of monitoring the selected computing node group, or information dynamically obtained by requesting a PES Capacity Maintenance Manager module or other monitoring source to provide that information) in order to currently determine whether any user-specified triggers for the selected computing node group are currently satisfied and/or were previously satisfied during the current aggregation period of time. After the various information is retrieved, the current desired program execution capacity may be determined by aggregating the one or more requested program execution capacity modifications, as discussed in greater detail elsewhere, in order to determine the resulting desired program execution capacity after any such aggregated capacity modifications are made.

After block 525, the routine continues to block 530 to determine the actual changes to be made to the selected computing node group in order to harmonize the current actual, desired and official recorded program execution capacities for the selected computing node group, such as to adjust the current official capacity to the current desired capacity. The routine then continues to block 535 to designate the current desired program execution capacity that will be provided by the modified selected computing node group as the updated current official recorded program execution capacity for the selected computing node group, and further initiates the program execution capacity modifications determined in block 530. After block 535, the routine continues to block 599 and returns.

Figure 6:
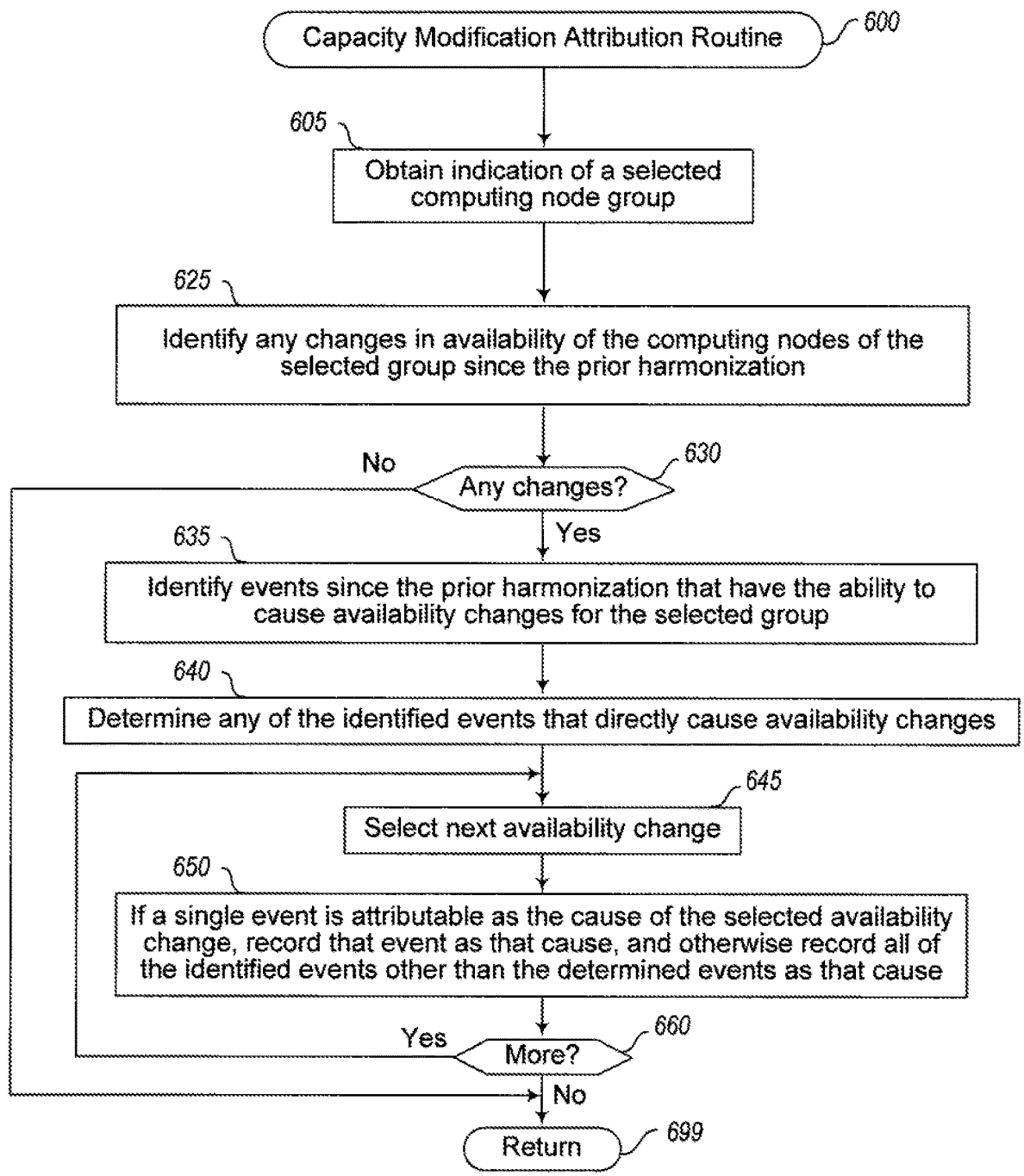
FIG. 6 illustrates a flow diagram of an example embodiment of a Capacity Modification Attribution routine.

FIG. 6 is a flow diagram of an example embodiment of a Capacity Modification Attribution routine 600. The routine may be provided by, for example, execution of the PESSM modules 110 and 180 of FIGS. 1A and 1B, respectively, and/or the PESSM module 340 of FIG. 3, such as may be initiated from block 475 of routine 400 in FIG. 4.

In the illustrated embodiment, the routine begins in block 605, where it obtains an indication of the currently selected computing node group for which capacity modification attribution activities are to be performed. In block 625, the routine then identifies information about program execution capacity availability changes that have occurred since a prior time, such as the prior harmonization activities that were performed for the selected computing node group. The identifying of the change information may include, for example, retrieving information that was previously stored by a PES Capacity Maintenance Manager module as part of monitoring the selected computing node group, although in other embodiments the routine 600 may dynamically determine the information (e.g., by dynamically requesting a PES Capacity Maintenance Manager module or other monitoring source to provide that information).

After block 625, the routine continues to block 630 to determine whether any such capacity availability changes have occurred, and if not continues to block 699. Otherwise, the routine continues to block 635 to identify information about program execution capacity modification request events that have occurred since a prior time, such as the prior harmonization activities that were performed for the selected computing node group. The identifying of the event information may include, for example, retrieving information that was previously stored by a PES System Manager module as part of providing functionality for the selected computing node group, such as discussed in greater detail with respect to FIGS. 4 and 5. In block 640, the routine then determines any of the identified events that directly cause corresponding availability changes, such as based on the types of events (e.g., automated system operations to replace unavailable computing nodes, received user instructions that specify an immediate corresponding response, etc.).

After block 640, the routine continues to block 645 to select the next availability change identified in block 625, beginning with the first. In block 650, the routine then determines whether this change is directly attributable to one of the individual events determined in block 640, and if so records that event as the cause for the selected capacity availability change. Otherwise, the routine in block 650 attributes the cause for the selected capacity availability change as being a combination of the other identified events that were not determined in block 640. In block 660, the routine then determines whether there are more capacity availability changes, and if so returns to block 645 to select the next such capacity availability change. Otherwise, the routine continues to block 699 and returns.

FIG. 7 is a flow diagram of an example embodiment of a Program Execution Service Capacity Maintenance Manager routine 700. The routine may be provided by, for example, execution of the PESCMM modules 115 and 160 of FIGS. 1A and 1B, respectively, and/or the PESCMM module 345 of FIG. 3, such as to assist in monitoring groups of computing nodes for users, including to determine actual program execution capacity that is available from computing node groups. In this illustrated embodiment, the routine 700 operates in conjunction with a program execution service that provides program execution capacity for executing programs on behalf of multiple users, although in other embodiments some or all of the functionality of the routine 700 may be provided in other manners.

In the illustrated embodiment, the routine begins at block 705, where an indication is received to initiate gathering of information about computing nodes of one or more computing node groups, such as continuously or otherwise in a repetitive manner—while not illustrated here, in some embodiments other modules and/or routines may dynamically request the routine 700 to generate and provide particular information of interest, such as with respect to a particular computing node group of interest. In block 705, the routine gathers performance characteristics information for one or more such computing nodes, including indications of the computing node groups to which those computing nodes belong, for later use in generating aggregate information for the computing node groups. The information may be gathered in various manners, including by pulling the information by requesting particular computing nodes or associated modules (e.g., associated VM manager components for virtual machine computing nodes) to provide the information, by such computing nodes and/or associated components pushing the information to the routine 700 (e.g., periodically; upon certain types of events, such as a detected error condition that will cause the computing node to shutdown or otherwise become unavailable; etc.), by monitoring network traffic and/or individual resource usage by particular computing nodes; etc.

The routine then continues to block 710 to determine aggregate performance characteristic information for one or more selected computing node groups and to store that determined information for later use, such as for all computing node groups, computing node groups for which individual computing node information was just gathered, computing node groups for which aggregate performance characteristic information has been requested or has not been generated recently, computing node groups for which individual computing node information is available for each of the computing nodes in the computing node group, etc. It will be appreciated that aggregate performance characteristic information may be generated in various manners, including when only partial information is available regarding the computing nodes of the group, such as be extrapolating or otherwise estimating individual performance characteristics information that is not available. In addition, particular performance characteristics information that is gathered and/or aggregated may vary in various manners, such as to always collect certain types of information for all computing node groups in certain embodiments, to collect certain types of information based on the criteria specified for determined triggers for particular computing node groups, etc. Furthermore, while blocks 705-785 are illustrated in this example as being performed in a sequential manner, it will be appreciated that various blocks may instead be performed in other manners in some embodiments. For example, in some embodiments, the information gathering activities of block 705 may be performed on a continuous basis or near-continuous basis, but the aggregate information generation of block 710 and/or other blocks may be performed only periodically.

After block 710, the routine continues to block 715 to determine and store current actual program execution capacity information for each of one or more computing node groups, such as to reflect a current quantity of computing nodes of a group that are currently available, and/or one or more other measures of program execution capacity for a computing node group, and stores the determined information for later use. While not illustrated here, in some embodiments and situations, the routine may further immediately update a corresponding official recorded program execution capacity for a computing node group to reflect the determined current actual program execution capacity for the computing node group, while in other embodiments will wait until a next corresponding group of harmonization activities to update the official recorded program execution capacity.

In block 720, the routine then optionally determines any capacity modification triggers for any computing node groups that have been satisfied for any computing node groups (e.g., based on performance characteristics information gathered in block 705 and/or aggregated in block 710, and/or based on actual program execution capacity information determined in block 715), although in other embodiments such trigger satisfaction determination may instead be performed at the end of an aggregation period of time, such as with respect to corresponding harmonization activities that are discussed in greater detail with respect to FIG. 5. If any triggers are determined to be satisfied, information about such satisfied triggers is then stored for later use. In some embodiments and situations, satisfaction of a particular trigger may further initiate an immediate program execution capacity modification for an associated computing node group, and if so such a program execution capacity modification activity may be initiated, and the routine may further record causation information that links that satisfied trigger with that program execution capacity modification activity, such as for later use with respect to routine 600 of FIG. 6.

In a similar manner, the routine in block 725 determines whether any computing nodes of any computing node groups have been initiated to be made available for the computing node group, but the initialization has failed or otherwise not completed within a specified period of time (e.g., 10 minutes). If so, the illustrated embodiment of the routine initiates the immediate providing of a replacement computing node for any such computing nodes, and the routine may further record causation information that links that initialized computing node unavailability as the cause of the initiated replacement activity. In other embodiments, such replacement activities may instead not be performed in an immediate manner (e.g., instead may be aggregated along with other requests to modify program execution capacity), and/or may instead be performed by the routine 400 of FIG. 4. In addition, as part of initiating replacement activities for such unavailable computing nodes, the routine may further take actions to terminate the unavailable computing node (e.g., if it is still running but is unresponsive).

In a similar manner, the routine in block 730 optionally initiates the immediate providing of a replacement computing node for any computing nodes of computing node groups that were previously in use as part of the computing node groups but are now identified as having failed or otherwise become unavailable, and if so the routine may further record causation information that links that computing node unavailability as the cause of the initiated replacement activity. In other embodiments, such replacement activities may instead not be performed in an immediate manner (e.g., instead may be aggregated along with other requests to modify program execution capacity) and/or may be performed by the routine 400 of FIG. 4, and/or other types of automated determinations may be performed that can automatically initiate immediate changes to program execution capacity for particular computing node groups. In addition, as part of initiating replacement activities for an unavailable computing node, the routine may further take actions to terminate the unavailable computing node (e.g., if it is still running but is unresponsive). Furthermore, as discussed in greater detail elsewhere, the routine may in some embodiments consider other factors when determining whether to immediately perform the replacement activities with respect to blocks 725 and/or 730, such as periods of time for which an associated user will be or has been charged, an amount of time until a next harmonization activity is scheduled to be performed that may affect the desirability of performing the replacement activities, etc.

After block 730, the routine continues to block 785 to optionally perform any housekeeping operations, including to update stored information as appropriate. After block 785, the routine continues to block 795 to determine whether to continue, such as until an explicit indication to terminate is received. If it is determined to continue, the routine returns to block 705, and otherwise continues to block 799 and ends. While the various activities described with respect to routine 700 are illustrated in this embodiment as being performed by a different module than the module that performs routine 400, in other embodiments some or all of the functionality of the two routines may be performed by a single module or otherwise combined.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    receiving, over one or more networks, a request to automatically make modifications to a quantity of virtual machine computing instances in a group of virtual machine computing instances executing a program on behalf of a user within a cloud-based program execution service, wherein the request specifies a performance metric to monitor and multiple thresholds relating to the performance metric including:
        a first threshold for the performance metric that, when reached, triggers an increase to the quantity, and
        a second threshold for the performance metric that, when reached, triggers a decrease to the quantity;
    in response to a first determination that the performance metric has reached any of the thresholds, making a first modification to the quantity of virtual machine computing instances in the group;
    monitoring the performance metric during a cooldown period after making the first modification; and
    in response to a second determination that the performance metric has reached any of the thresholds, making a second modification to the quantity of virtual machine computing instances in the group after the cooldown period is over.

2. The computer-implemented method of claim 1, further comprising:
    obtaining, from a monitoring system, performance characteristics associated with the group of virtual machine computing instances; and
    determining the performance metric based on the performance characteristics.

3. The computer-implemented method of claim 2, wherein the performance metric to monitor is an aggregate performance metric comprising an average performance metric across the group of virtual machine computing instances.

4. The computer-implemented method of claim 1, wherein the performance metric to monitor comprises at least one of:
    CPU utilization; or
    memory utilization.

5. The computer-implemented method of claim 4, wherein:
the performance metric to monitor comprises CPU utilization;
the first threshold indicates a first CPU utilization percentage;
the second threshold indicates a second CPU utilization percentage; and
the request further specifies a first number of virtual machine computing instances to add to the group of virtual machine computing instances when the first threshold is reached, and a second number of virtual machine computing instances to remove from the group of virtual machine computing instances when the second threshold is reached.

6. The computer-implemented method of claim 1, wherein the request further specifies at least one of:
a minimum number of virtual machine computing instances for the group of virtual machine computing instances;
a maximum number of virtual machine computing instances for the group of virtual machine computing instances; or
an initial number of virtual machine computing instances for the group of virtual machine computing instances.

7. The computer-implemented method of claim 1, wherein the request further indicates an amount of time specified by the user for the cooldown period.

8. The computer-implemented method of claim 7, wherein the amount of time for the cooldown period indicates how long to refrain from modifying the quantity of virtual machine computing instances of the group, despite any of the thresholds being reached, after completing a modification to the quantity of virtual machine computing instances.

9. The computer-implemented method of claim 7, wherein the cooldown period begins upon completion of a modification to the quantity of virtual machine computing instances made based on any of the thresholds being reached.

10. The computer-implemented method of claim 1, wherein each virtual machine computing instance of the group of virtual machine computing instances executes a distinct copy of the same program.

11. The computer-implemented method of claim 10, further comprising:
balancing the computing load for executing the program across the virtual machine computing instances of the group of virtual machine computing instances.

12. The computer-implemented method of claim 1, further comprising:
providing a Graphical User Interface (GUI) to be displayed to the user, wherein the GUI is configured to enable the user to specify the performance metric to monitor and also to specify the multiple thresholds for the performance metric.

13. A non-transitory computer-readable storage medium having instructions which, when executed by one or more processors of one or more computing devices, cause the one or more computing devices to perform operations comprising:
receiving, over one or more networks, a request to automatically make modifications to a quantity of virtual machine computing instances in a group of virtual machine computing instances executing a program on behalf of a user within a cloud-based program execution service, wherein the request specifies a performance metric to monitor and multiple thresholds relating to the performance metric including:
a first threshold for the performance metric that, when reached, triggers an increase to the quantity, and
a second threshold for the performance metric that, when reached, triggers a decrease to the quantity;
in response to a first determination that the performance metric has reached any of the thresholds, making a first modification to the quantity of virtual machine computing instances in the group;
monitoring the performance metric during a cooldown period after making the first modification; and
in response to a second determination that the performance metric has reached any of the thresholds, making a second modification to the quantity of virtual machine computing instances in the group after the cooldown period is over.

14. The non-transitory computer-readable storage medium of claim 13, wherein the operations further comprise:
obtaining, from a monitoring system, performance characteristics associated with the group of virtual machine computing instances; and
determining the performance metric based on the performance characteristics.

15. The non-transitory computer-readable storage medium of claim 14, wherein the performance metric to monitor is an aggregate performance metric comprising an average performance metric across the group of virtual machine computing instances.

16. The non-transitory computer-readable storage medium of claim 13, wherein the performance metric to monitor comprises at least one of:
CPU utilization; or
memory utilization.

17. The non-transitory computer-readable storage medium of claim 16, wherein:
the performance metric to monitor comprises CPU utilization;
the first threshold indicates a first CPU utilization percentage;
the second threshold indicates a second CPU utilization percentage; and
the request further specifies a first number of virtual machine computing instances to add to the group of virtual machine computing instances when the first threshold is reached, and a second number of virtual machine computing instances to remove from the group of virtual machine computing instances when the second threshold is reached.

18. A system comprising:
a first one or more electronic devices to host virtual machine computing instances for executing programs; and
a second one or more electronic devices to implement a manager, the manager including instructions that upon execution cause the manager to:
receive, over one or more networks, a request to automatically make modifications to a quantity of virtual machine computing instances in a group of virtual machine computing instances executing a program on behalf of a user using one or more of the first one or more electronic devices, wherein the request specifies a performance metric to monitor and multiple thresholds relating to the performance metric including:
- a first threshold for the performance metric that, when reached, triggers an increase to the quantity, and
- a second threshold for the performance metric that, when reached, triggers a decrease to the quantity;

in response to a first determination that the performance metric has reached any of the thresholds, make a first modification to the quantity of virtual machine computing instances in the group;

monitor the performance metric during a cooldown period after making the first modification; and in response to a second determination that the performance metric has reached any of the thresholds, make a second modification to the quantity of virtual machine computing instances in the group after the cooldown period is over.

19. The system of claim 18, wherein the request further indicates an amount of time specified by the user for the cooldown period.

20. The system of claim 19, wherein:
- the amount of time for the cooldown period indicates how long to refrain from modifying the quantity of virtual machine computing instances of the group, despite any of the thresholds being reached, after completing a modification to the quantity of virtual machine computing instances; or
- the cooldown period begins upon the completion of a modification to the quantity of virtual machine computing instances made based on any of the thresholds being reached.

21. The system of claim 1, wherein the first one or more electronic devices and the manager implemented by the second one or more electronic devices are part of a cloud-based program execution service.

* * * * *